(12) United States Patent
Tallal et al.

(10) Patent No.: US 6,413,098 B1
(45) Date of Patent: Jul. 2, 2002

(54) METHOD AND DEVICE FOR ENHANCING THE RECOGNITION OF SPEECH AMONG SPEECH-IMPAIRED INDIVIDUALS

(75) Inventors: Paula Anne Tallal; Michael Mathias Merzenich, both of San Francisco; William Michael Jenkins, Pacifica; Steven Lamont Miller, Pacifica; Christoph E. Schreiner, Pacifica, all of CA (US)

(73) Assignees: The Regents of the University of California, San Francisco, CA (US); Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 09/665,775

(22) Filed: Sep. 19, 2000

Related U.S. Application Data

(63) Continuation of application No. 09/377,944, filed on Aug. 20, 1999, now Pat. No. 6,302,697, which is a continuation of application No. 08/773,691, filed on Apr. 9, 1997, now Pat. No. 6,123,548, which is a continuation of application No. 08/351,803, filed on Dec. 8, 1994, now abandoned.

(51) Int. Cl.[7] .............................. G09B 9/00; G09B 23/00
(52) U.S. Cl. ....................... 434/185; 434/118; 434/156; 434/169; 704/238; 704/254
(58) Field of Search ................................. 434/118, 156, 434/169, 185, 307 R–309, 322, 323, 350, 362, 365; 704/207–211, 238, 239, 254, 265–268, 275, 276; 369/60.01; 367/198; 381/56–58, 111, 123, 320

(56) References Cited

U.S. PATENT DOCUMENTS

| | | | | |
|---|---|---|---|---|
| 3,816,664 A | * | 6/1974 | Koch ........................ 369/60.01 |
| 3,920,903 A | * | 11/1975 | Beller ........................ 434/185 |
| 3,946,157 A | * | 3/1976 | Dreyfus ...................... 367/198 |
| 4,010,557 A | * | 3/1977 | Martin et al. ................ 434/317 |
| 4,128,737 A | * | 12/1978 | Dorais ........................ 704/265 |
| 4,327,252 A | * | 4/1982 | Tomatis ...................... 381/111 |
| 4,464,119 A | * | 8/1984 | Vildgrube et al. ............ 381/56 |
| 4,586,905 A | * | 5/1986 | Groff ...................... 434/307 R |
| 4,641,343 A | * | 2/1987 | Holland et al. .............. 434/185 |
| 4,696,042 A | * | 9/1987 | Goudie ........................ 704/254 |
| 6,236,964 B1 | * | 5/2001 | Tamura et al. .............. 704/238 |
| 6,289,310 B1 | * | 9/2001 | Miller et al. ................ 381/320 |

\* cited by examiner

*Primary Examiner*—Joe H. Cheng
(74) *Attorney, Agent, or Firm*—Finley & Berg; James W. Huffman

(57) ABSTRACT

A method and a system is disclosed that provide means to enable individuals with speech, language and reading based communication disabilities, due to a temporal processing problem, to improve their temporal processing abilities as well as their communication abilities. The method and system include provisions to elongate portions of phonemes that have brief and/or rapidly changing acoustic spectra, such as occur in the stop consonants b and d in the phonemes /ba/ and /da/, as well as reduce the duration of the steady state portion of the syllable. In addition, some emphasis is added to the rapidly changing segments of these phonemes. Additionally, the disclosure includes method for and computer software to modify fluent speech to make the modified speech better recognizable by communicatively impaired individuals. Finally, the disclosure includes method for and computer software to train temporal processing abilities, specifically speed and precision of temporal integration, sequencing and serial memory.

21 Claims, 18 Drawing Sheets

METHOD AND DEVICE FOR ENHANCING THE RECOGNITION OF SPEECH AMONG SPEECH-IMPAIRED INDIVIDUALS

This application is a continuation of U.S. patent application Ser. No. 09/377,944, filed Aug. 20, 1999, now U.S. Pat. No. 6,302,697 B1, which is a continuation of U.S. patent application Ser. No. 08/773,691, filed Apr. 9, 1997, now U.S. Pat. No. 6,123,548, which is a continuation of application Ser. No. 08/351,803, filed Dec. 8, 1994, now abandoned.

BACKGROUND OF THE INVENTION

This invention relates to the modification of audio sounds, in particular, speech sounds, to enable individuals who are impaired with speech and language-based learning disabilities (L/LDs) due to a temporal processing problem to improve their speech reception, speech production, language comprehension and reading abilities. In addition, it includes training methods to help individuals with speech and language-based learning disabilities to overcome their temporal processing deficits so that they can recognize basic speech elements and normal connected speech with higher accuracy and greater intelligibility. In addition, it includes a training method to help normal individuals in the improvement of their speech reception capabilities, for either their native language, or for foreign language training.

Recent studies have shown that specific language impaired (SLI) and specifically reading impaired (dyslexic) individuals have an inability to recognize and distinguish between certain consonants and consonant-vowel combinations in natural speech. They also have difficulties in understanding written speech that appears to result from their problems in understanding aural speech. This difficulty with aural speech perception results in a delayed and usually defective development of reading skills. Studies have shown that these problems in speech reception and reading acquisition are not the result of peripheral hearing or visual deficits, but rather are due to an inability of the receptive and cognitive powers of the brain to correctly identify the rapidly changing components of speech. For example, L/LD individuals have difficulty correctly identifying the rather short consonant sounds (a few tens of milliseconds long) or to reliably separate them from associated longer vowel sounds. Consequently the individuals are unable to generate a reliable representation of the fundamental phonetic elements of the native language in their brains. The result is that the impaired individual not only has difficulty correctly identifying the unique sounds of spoken words and strings of connected speech, but also often has associated difficulties in learning to accurately articulate speech. In addition, the impaired individual may have limited cognitive abilities that rely on accurately recognizing words and long speech strings, and limited abilities in cognitively associating written speech with their brain's poor representations of aural speech.

In particular, consonant sounds generally have a frequency modulated component such that the sound frequency may rise or fall, or be interrupted by pauses that last for less than 25 milliseconds to more than 80 milliseconds. This rising or falling sound frequency or brief interruptions of the consonant sounds are followed or preceded by a vowel sound, which has a relatively constant or more slowly changing spectral content, and which usually extends over a period of from many tens of milliseconds up to several hundred milliseconds. The majority of individuals with L/LDs (dysphasia or dyslexia) cannot distinguish between the consonant-vowel combinations (for example, /ba/ and /da/, or /ab/ and /ad/) when the frequency modulated components of the consonants /b/ and /d/ are of normal duration (for example, less than 60 to 80 milliseconds long).

The basic temporal processing deficit in L/LDs is also reliably demonstrated by testing a dysphasic and/or dyslexic individual's ability to identify sounds that are presented in rapid succession, as commonly occurs for successive phonetic elements in normal speech reception. For example, an L/LD child or adult commonly cannot correctly identify the order of presentation of two different, successive vowel-like stimuli that are each 50 milliseconds in duration unless they are separated in time by more than 100 milliseconds, and often by more than several hundred milliseconds. By contrast, a normal individual can identify the sequence order of presentation of such stimuli when they are immediately successive, that is, with no intervening interstimulus time gap.

The result of this fundamental problem in the reception of short-duration and fast successive components of speech is readily apparent in the school system, where individuals diagnosed with dysphasia and dyslexia with this temporal processing difficulty will run two-to-four, and maybe more, years behind their peers in scholastic achievement. The result is that L/LDs commonly require additional specialized training, with great emphasis on speech recognition and speech production. Dyslexics similarly receive special training to help them learn to read. Special speech reception, speech production and reading instruction continues generally throughout the elementary and secondary school educations for many of these individuals if the resources are available. The impairment can often lead to a truncation in education, and commonly results in impairment for life. However, some success is shown for special training.

Initially, failure of identification of consonant-vowel combinations such as /ba/ and /da/ with short duration consonant frequency modulations of less than 60 milliseconds, or failure to identify the temporal order of simple acoustic stimuli unless they are separated by 150 or more milliseconds, has established a means of identifying L/LDs with this temporal processing deficit. However, no prior training strategy has shown consistently positive results in overcoming the temporal processing deficits that underlie L/LDs. Overcoming this temporal processing deficit should result in a more useful and normal life for individuals with this affliction.

Recent studies have shown that these speech and language-based learning disabilities are seated in defective temporal processing of sensory information by the brain. Moreover, they have shown that temporal processing abilities are subject to strong learning effects in normal individuals. The basic processes underlying this temporal process learning are increasingly better understood.

In addition to L/LDs, brain damaged individuals have shown similar symptoms. In particular, individuals who have suffered strokes or otherwise damaged portions of their language-dominant cerebral hemispheres commonly lose the ability to discriminate between normal consonant sounds and show temporal processing deficits that are very similar to those in L/LD individuals. As with L/LD individuals, these aphasic individuals can also correctly identify speech elements when they are presented to the patient in a slowed-down form.

Aged individuals also show a progressive deterioration in their temporal processing abilities, as judged by these same tests. This deterioration contributes to a cognitive-based deficit that affects their speech reception and general cognitive abilities.

The reception of, or learning of, a foreign language in an indigenous environment is difficult and sometimes almost insurmountable for normal individuals because of the speed at which the language is spoken. Foreign languages are consequently learned by rote memorization and repeated practice exercises, with the speed of talking increased commensurate with the ability to understand the spoken language. There is no set means for individuals learning a foreign language in the indigenous environment (that is, in the native country of the language) except by asking the foreign language speaker to "slow down" or to "repeat". Most of the problems in learning foreign languages in this indigenous environment can be attributed to the lack of recognition in the temporal processing of fast .events in one's brain of the incoming speech sounds.

While the phonemes of foreign languages differ in construction from the English language, the principles behind all spoken languages remain constant. That is, all languages can be broken down into fundamental sound structures known as phonemes. It is the recognition of these phonemes, such as the consonant-vowel syllables /ba/ and /da/ in the English language, that form the basic building blocks that must be learned. As with the L/LD individual, the foreign language student does not recognize these phonemes reliably when they are presented at their normal element durations and normal element sequence rates by native language speakers. As with L/LDs, they can be accurately distinguished from one another and can be correctly identified when the speech is artificially slowed down.

It is an object of this invention to provide a means for easier recognition of phonemes and connected speech in L/LD individuals.

It is a further object of this invention to provide a training strategy for rapidly and progressively improving the recognition of phonemes and connected speech in L/LD individuals.

It is another object of this invention to employ training signals that are more powerful than normal speech for generating changes in temporal processing by the brain achieved through learning exercises.

It is the further object of this invention to use a modified version of this training strategy as a method for screening human populations to identify those individuals who would benefit from this invention.

It is also an object of this invention to provide phoneme and connected speech recognition and a training strategy for rapidly and progressively improving the recognition of phonemes and connected speech in individuals that have suffered brain damage to their dominant speech-language hemisphere that has resulted in a temporal processing deficit like that recorded in L/LDs.

It is a further object of this invention to provide phoneme and connected speech recognition and a training strategy for rapidly and progressively improving the recognition of phonemes and connected speech in individuals who have undergone age-related or disease-related deterioration of their temporal processing abilities for speech sound reception.

It is still a further object of this invention to provide easier recognition of phonemes and connected speech in the learning of a foreign language.

It is still a further object of this invention to provide improved temporal processing of fast speech sounds in normally fluent individuals, to improve their learning capabilities and their potential cognitive achievements.

In one aspect of the invention, a method of increasing the ability of a human being to process aurally received signals is disclosed as a method. The method consists of recording audio sounds in a computerized system. The method includes a step of modifying the amplitudes and timings of recordings of certain phonetic elements without changing their fundamental frequencies. Finally, the invention includes converting the modified digital signals to analog aural signals for presentation to the individuals.

In a second aspect of the invention, a method for increasing the ability of a human being to distinguish and separate fast sequential aurally received signals is disclosed as a method. The method consists of controlling the sound output of fast phonetic or non-speech sounds in computer-mounted games, at which the human being works to correctly recognize progressively faster sound presentations, or in which the human subject works to distinguish the time order of presentation or the separate identities presented at progressively shorter durations, at progressively faster rates, and with progressively longer and longer sound element sequences.

The invention also encompasses a method for increasing the ability of a human being to recognize long, connected speech strings, and to rapidly improve. their performances at related cognitive tasks. Speech sounds of training exercises designed for L/LD children are modified in a computerized system, as above. All speech applied in training exercises and on library materials are delivered in this modified form.

The invention also encompasses a computerized system for structuring recorded audio information to enable speech and language impaired or normal individuals to better understand spectro-temporally complex audio sounds. The system consists of a computer having input means for receiving information including the processor means for manipulating the received information; storage means for storing unprocessed, received information and manipulated information; and output means responsive to the processor means for presenting the manipulated information in a form understandable, and providing an effective learning signal, to a user. The computerized system also includes first program means for modifying digitally recorded audio sounds having a frequency range associated therewith to lengthen and to selectively amplify fast (primarily consonant) acoustic elements in speech without modifying the frequency range. Second program means are provided responsive to the received information and the processor means for storing the modified, digitally recorded speech sounds. Third program means responsive to the received information and to the processor are provided to direct the stored, modified, digitally recorded speech sounds to the output means.

DESCRIPTION OF THE PREFERRED EMBODIMENTS

Figure 1:
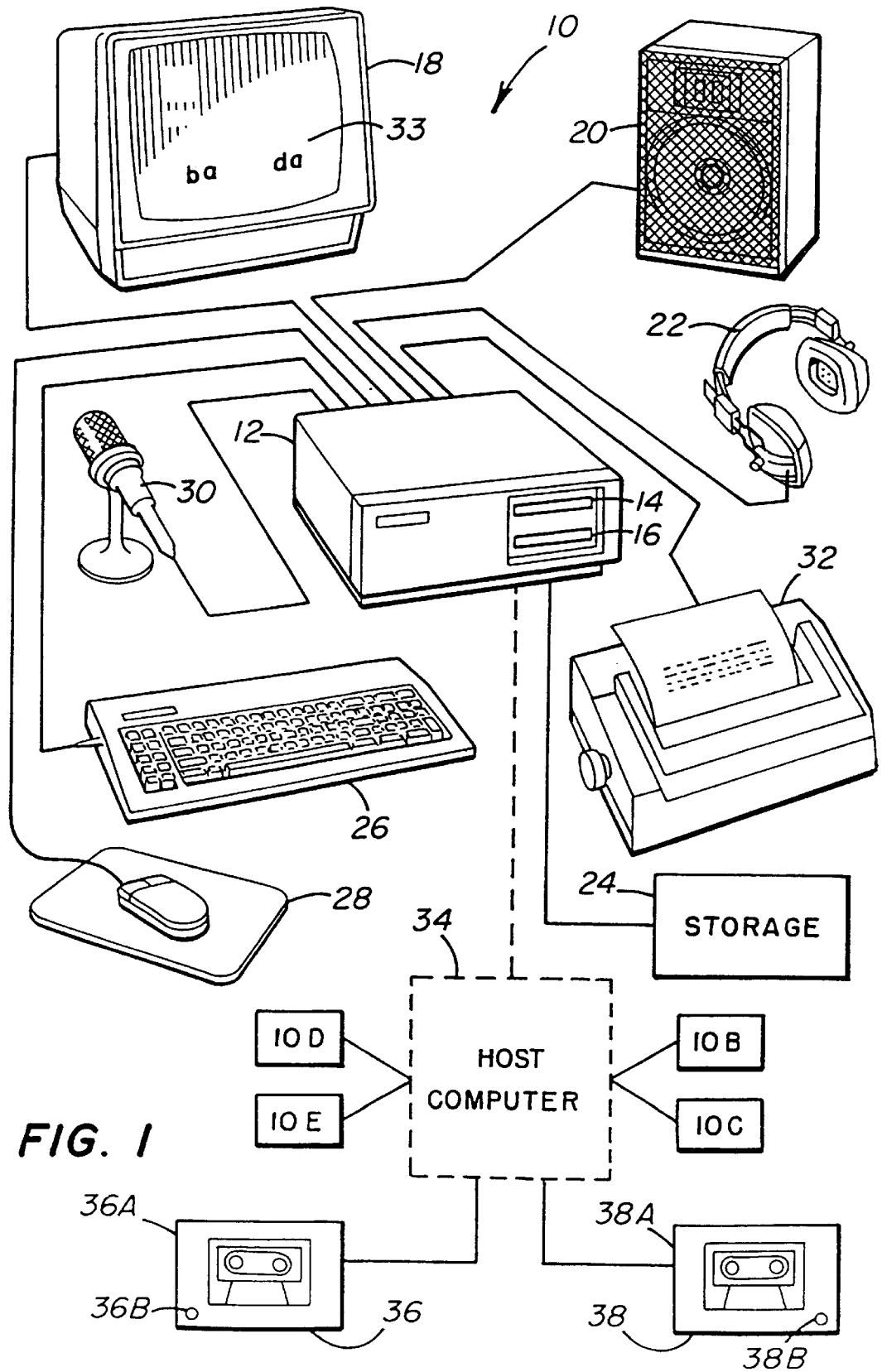
FIG. 1, is a general diagram of a computer system that would be used to implement remediation of auditory temporal processing deficits.

Referring to FIG. 1, a computer system appropriate for use in the present invention for enhancing the recognition of speech among speech-impaired individuals (L/LDs) is shown. The computer system 10 consists of a processor 12 made up of a conventional type system such as available from Apple or one of the IBM or IBM-compatible clones. The processor 12 includes a CD-ROM capability 14 and a conventional floppy disk capability 16. Appropriate software is provided in the processor 12 to support not only the CD-ROM but also the floppy disk capability.

In addition to the processor 12, a conventional visual display tube or VDT 18 is included, which may or may not be capable of displaying color, although the color format enhances two aspects of this invention, namely, the game-playing and training exercise aspects. Additional VDT's may also be included.

A speaker 20 is provided which is supported by appropriate software in the processor 12. In addition to the speaker 20 are headsets 22 which can privatize the invention to an individual person(s).

Finally, to make the system usable to the subject or patient, storage 24 is provided to store the appropriate programs and also the appropriate data that is utilized. Storage 24 is responsive to processor 12, as are the VDT 18, the speaker 20, and headsets 22. Storage 24 can also be used to accumulate progress reports and generate statistics on the individual user(s).

The VDT 18, the speaker 20, and headsets 22 are hereinafter referred to as the "output" when referred to generally in the system. The input devices include a keyboard 26, which may or may not be utilized by the patient, and a mouse 28, which is appropriate for use in the entire invention. A touch sensitive screen 33, can be used in lieu of the mouse and is particularly useful with young children. Finally, an input microphone 30 may be provided to record various oral sounds in order to assess speech production performance by the L/LD individual or to assist in the development of additional verbal program material.

A printer 32 may also be included to provide output on the progress of the patient being trained in this system.

While not necessarily a part of the system, the processor 12 may be a peripheral unit to a host computer 34 in a network of computers. Host computer 34 could control several processors 12 with the appropriate peripherals, as shown in FIG. 1. Other systems such as 10(b), (c), (d), and (e) would, in effect, be essentially the same as the system 10. Further modification may place the printer, for example, under direct control of the host computer so it would not be necessary to have a printer at each remote station.

In addition to the computer hardware set forth above, in order to operate this system and enhance the training program, certain audio tape recorders are required for use by the student in running this system. These tape recorders are shown as 36 and 38 in FIG. 1. They are attached to host computer 34 for convenience's sake; however, it should be understood that the tape recorders can be independent and in that instance would include their own headsets 36(a) and 38(a). In addition, microphones 36(b) and 38(b) would also be included with the tape recorders. Thus tape recorders 36 and 38 can not only provide audio signals to the headsets 36(a) and 38(a), but also can receive input through microphones 36(b) and 38(b) in the conventional manner. The tape recorders are shown associated with host computer 34 for convenience's sake only; however, they can be stand-alone for the various tests, games and training regimes herein.

The purpose of the computer system 10 is to develop appropriate training programs and to provide a medium for patients to practice their language skills, and, in particular, to overcome handicaps or deficits in temporal processing that have resulted in impairment of speech reception and/or production, or to improve their normal temporal processing capabilities. In particular, computer system 10 is utilized to provide a medium for L/LD or normal subjects including school-aged children, aged individuals and foreign language students, or aphasic patients to distinguish between differing sounds. For example, in a program recorded on CD-ROM, a game is presented to young children between the ages of 5 and 10 wherein the computer not only provides the training but also provides rewards to the subject students. In the example used in the invention, a sequence is developed around a circus game, complete with music and video signals showing clowns, animals, and the like, as background to audio signals.

Figure 2:
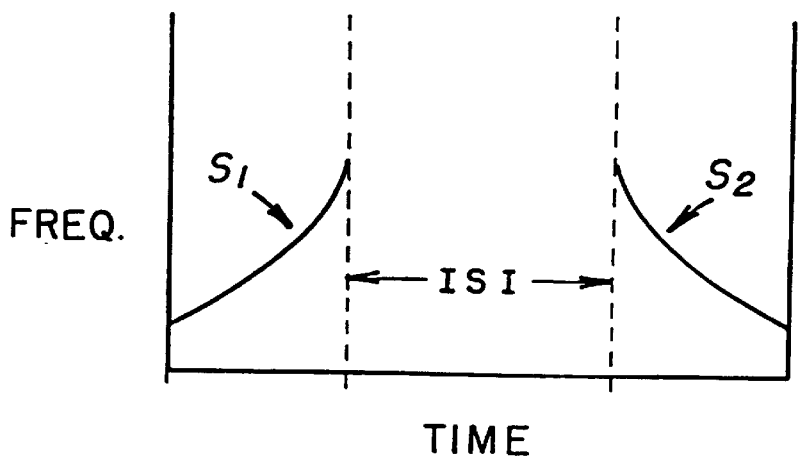
FIG. 2 is a spectrographic plot of a low to high frequency modulated sweep (S1) and a high to low frequency modulated sweep (S2) separated by an interstimulus interval (ISI)
Figure 3:
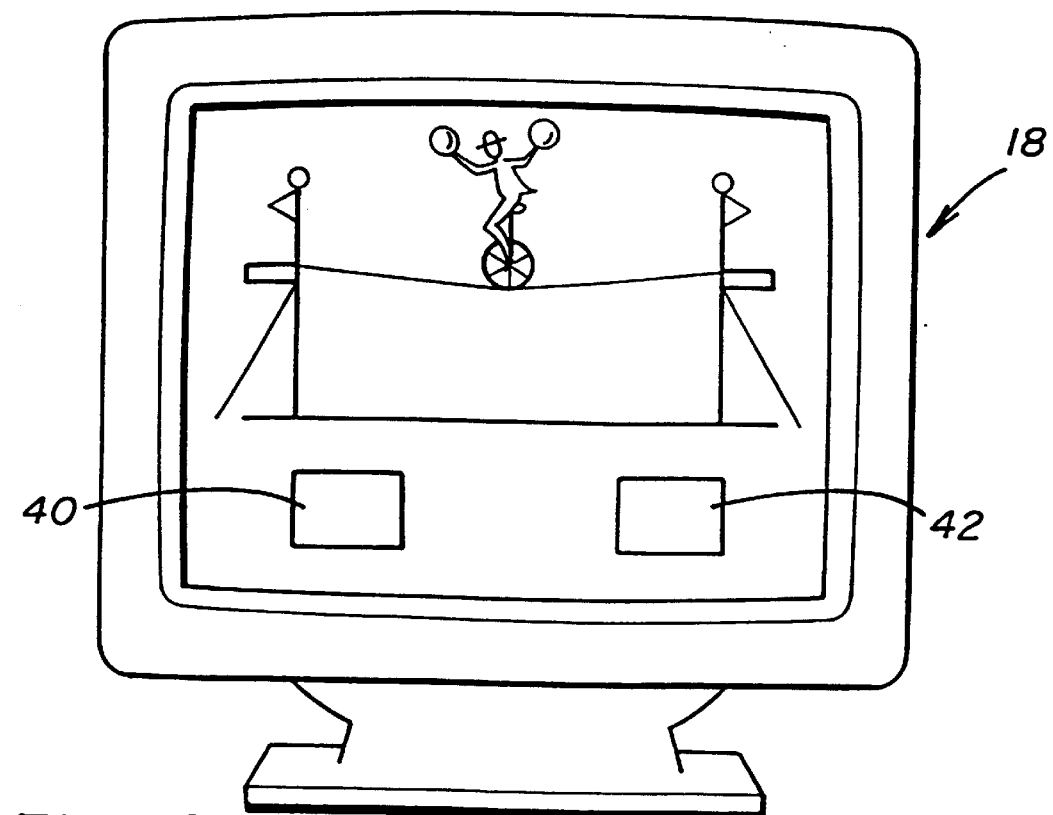
FIG. 3 is a depiction of a VDT with graphical icons and symbols thereon.

FIG. 2 is an example of the audio sounds presented in one of the elementary games employed in training. In FIG. 2, two differing audio signals, one with an increasing frequency $S_1$ and one with a decreasing frequency $S_2$, are presented to a student with an inter-stimulus interval (ISI) determined by the program. The signals $S_1$ and $S_2$, as shown by example in FIG. 2, are varied in the sequence; that is, the increasing signal $S_1$ may be sounded first, followed by the decreasing signal $S_2$ in the first presentation, while in the second, the decreasing signal $S_2$. is followed by the increasing signal $S_1$. The student is asked to respond utilizing the mouse 28 by moving a cursor between two boxes 40 and 42 displayed on VDT 18 (see FIG. 3).

For example, the increasing sound would always be the left box 40 and the decreasing sound would always be the right box 42. If the decreasing sound came first, the student would move the cursor to the box on the right and "click" or touch on the right box. If the increasing sound came first, then the student would click or touch on the left box. Correct responses result in a display on the screen of a clown dancing, some music playing, or some other appropriate visual reward.

A sequence of several correct responses, for example, three, results in a decrease in the inter-stimulus interval, for example, from 200 to 195 milliseconds. Continued improvement has been shown in presenting such a problem to a L/LD child over a period of four to six weeks. More will be said about this in the results of the experiments conducted, of which a description is provided below.

Once the patient completes a certain amount of auditory sequence training, the patient would be shifted to a different type of display on the VDT, within the format of the same or a different. game. In particular, stop consonant syllables for testing and training phoneme identification such as the stop consonants /ba/ and /da/ would be used as target signals in a game. The purpose of this portion of the training is to overcome a common failing in dysphasic children in distinguishing between various consonants. For example, the two consonants /ba/ and /da/ are quite often confused in this situation.

Initially, the patient is tested in a manner similar to that set forth above. In the phoneme identification training the patient is required to indicate if the target phoneme was presented first or second in the sequence. For example, by first distinguishing between the sounds /ba/ and /da/ with a long interstimuli interval of upwards of 500 milliseconds. During training, the ISI is decreased as the patient progresses in recognizing the sounds /ba/ and /da/ and other stop consonants. However, this system envisions taking the phoneme /ba/ or the phoneme /da/, for example, and prolonging the fast-acting or stop consonants, /b/ and /d/, respectively. In a normal speech pattern, the consonants /b/ and /d/ in these two phonemes occur in approximately 40 to 50 milliseconds, while the following vowel sound of the letter "a" may be five or six times as long. These sounds are represented graphically in FIG. 4. In order to improve the patient's recognition of these sounds, it has been found that if the consonant portion of the sound, that is, the /b/ or the /d/, is prolonged or doubled to approximately 80 milliseconds, then the patient can consistently and accurately identify the phoneme. The initial lack of recognition is attributable in the impairment in the temporal processing in the individuals with the learning disability.

Figure 4:
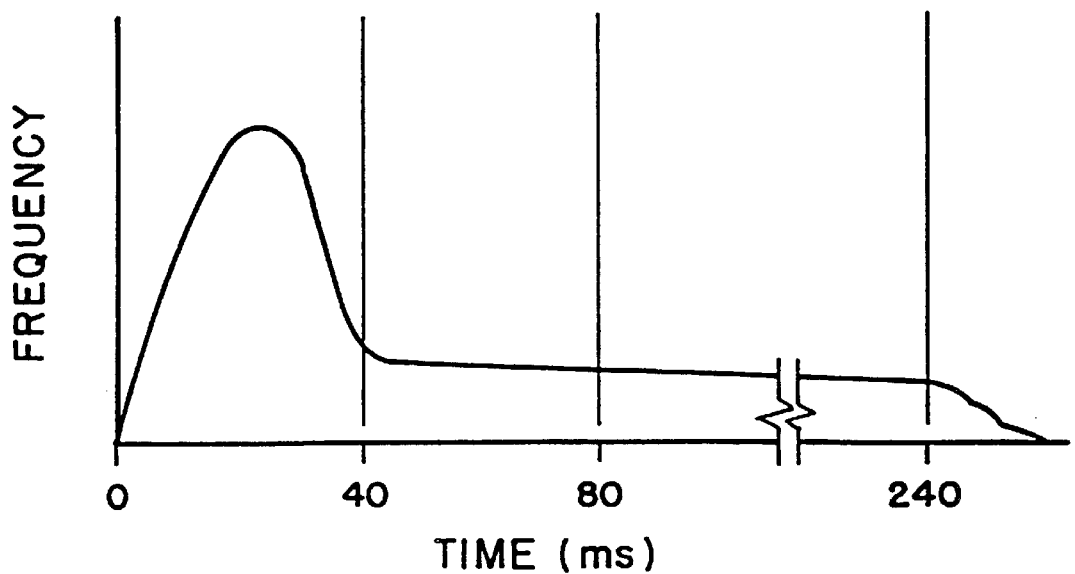
FIG. 4 is a graphical representation of a normal consonant-vowel combination, plotting frequency against time.
Figure 5:
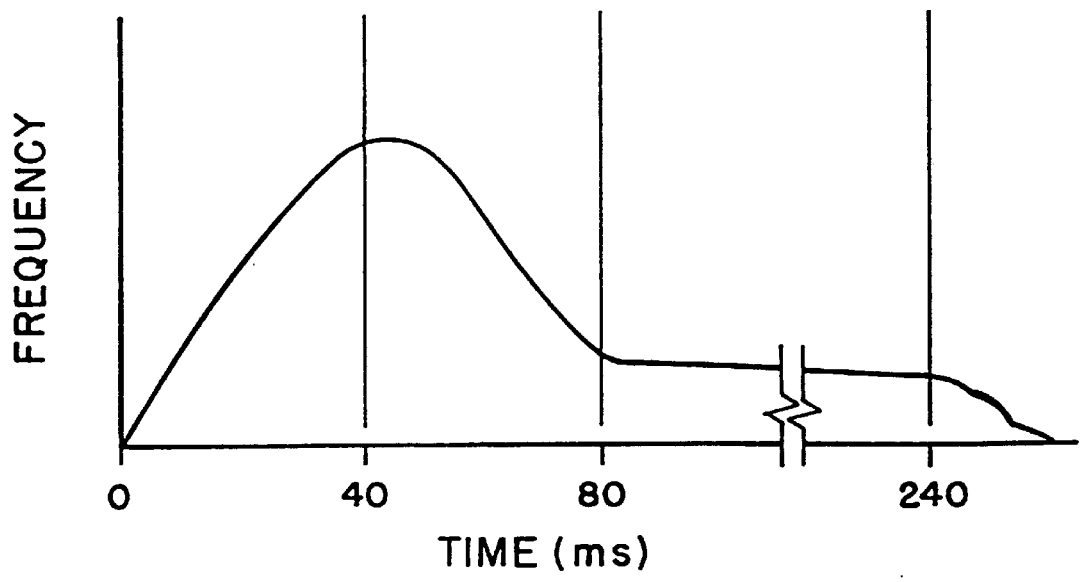
FIG. 5 is a graphical representation of a time-expanded consonant-vowel combination, plotting frequency against time.

In FIG. 5, this prolonged consonant sound is shown with a commensurate decrease in the duration of the vowel sound. The decrease in the vowel sound need not be accomplished in the training phase; however, as will be explained subsequently, when it is necessary to "rescript" an existing recording, be it oral or video, for use by individuals with a learning disability, it is appropriate to truncate the vowel sounds in "real time" so that the elapsed time of the recording is not changed. Hence, any extension of a portion of a phoneme must be accompanied by an equivalent reduction in another portion of the spoken word. Thus, FIG. 5 represents such a reduction, where the elapsed time of the modified phoneme (240 ms) is the same as the unmodified phoneme shown in FIG. 4. Careful editing of the original audio information may permit some truncation of the silent periods between words or sentences.

The testing of the /ba/ and /da/ identification, or an equivalent stop consonant identification, is accomplished in a similar manner as set forth above, and can be accompanied by a circus-like game or other context to make it more attractive to young children. As the subject achieves improved ability to correctly identify phonemes with consonant sounds of a given duration, the task can be made more difficult to drive improvements in performance, for example by shortening is the stop consonant sound duration from 80 to 70 msec, and so forth.

In order to provide continued interest, variety, and additional exposure to modified speech training material, it has been found that commercially available "Books on Tape" and video games, in particular interactive CD-ROMs that are rich in speech content, become understandable to learning impaired individuals if the verbal material is modified to lengthen the stop consonants, then matching the modified sound with the original video material. Lengthening of 50% to 100% has been found to be appropriate. If there are accompanying video or animated graphics, as is the case with video games, then the visual material may need modification also, or the sound may need compensating compression to fit a real-time situation. This same procedure can be used in the teaching of a foreign language where the fast consonants are initially lengthened appropriately.

In addition to lengthening, it is also important to emphasize the fast or stop consonants by increasing the energy thereof by, for example, 20 dB. This increases the relative salience for learning these critical speech elements that are so poorly understood by L/LD and other temporal processing impaired humans. The time envelope of this differential amplification of fast speech elements is an important second variable of this fast or stop consonant element emphasis.

Having briefly explained the nature of the tests, the nature of the training with respect to this invention, and the necessary changes to existing material, it is appropriate to pass on to software that may be used to develop content test and training material, to rescript "Books on Tape", or to modify and rescript existing video games.

Reference should be made to FIGS. 6A, 6B, 6C and 6D. It is to be understood that the flow charts in FIGS. 6A, 6B, 6C and 6D are representative only, and could be done in separate increments rather than a single program as illustrated herein.

Figure 6A:
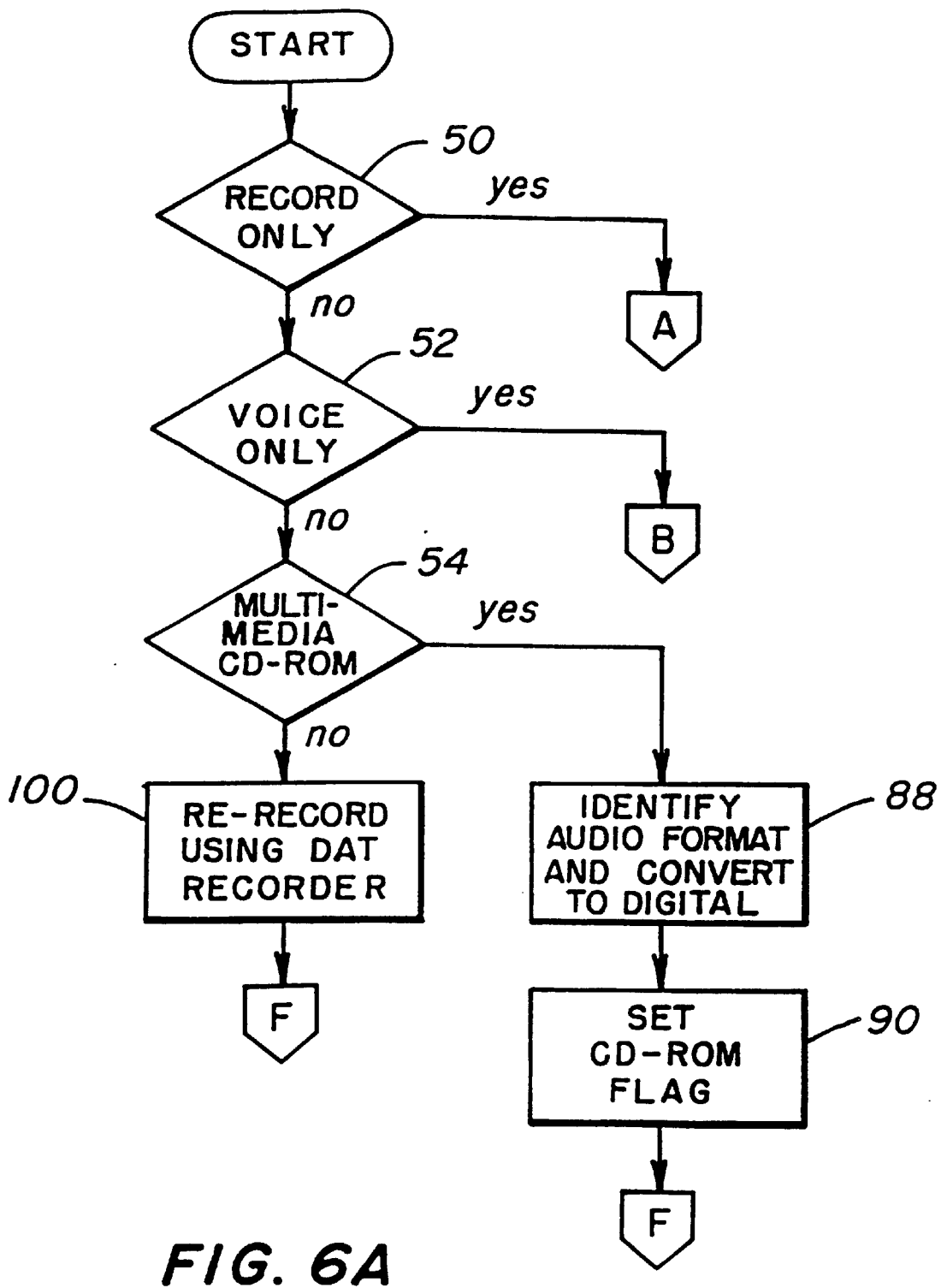
FIGS. 6A, 6B, 6C and 6D are flow charts showing a computer program that is used to develop the training program.

Referring to FIG. 6A, the user is first faced with a decision whether training material is to be developed (RECORD ONLY—decision block 50), "Books on Tape" are to be modified for use by individuals with learning disabilities (VOICE ONLY—decision block 52), or whether a CD-ROM with a video game is to be modified (MULTIMEDIA—decision block 54). The training material, as noted above, include the stop consonant phonemes, for example, /ba/ and /da/. The "Books on Tape" are clear from the textual point of view. However, to clarify, it has been found appropriate to modify "Books on Tape" such that an individual with learning disabilities can understand the modified spoken words which, without modification, would not be as intelligible to that individual. CD-ROM or multimedia, of course, includes video games.

Figure 6B:
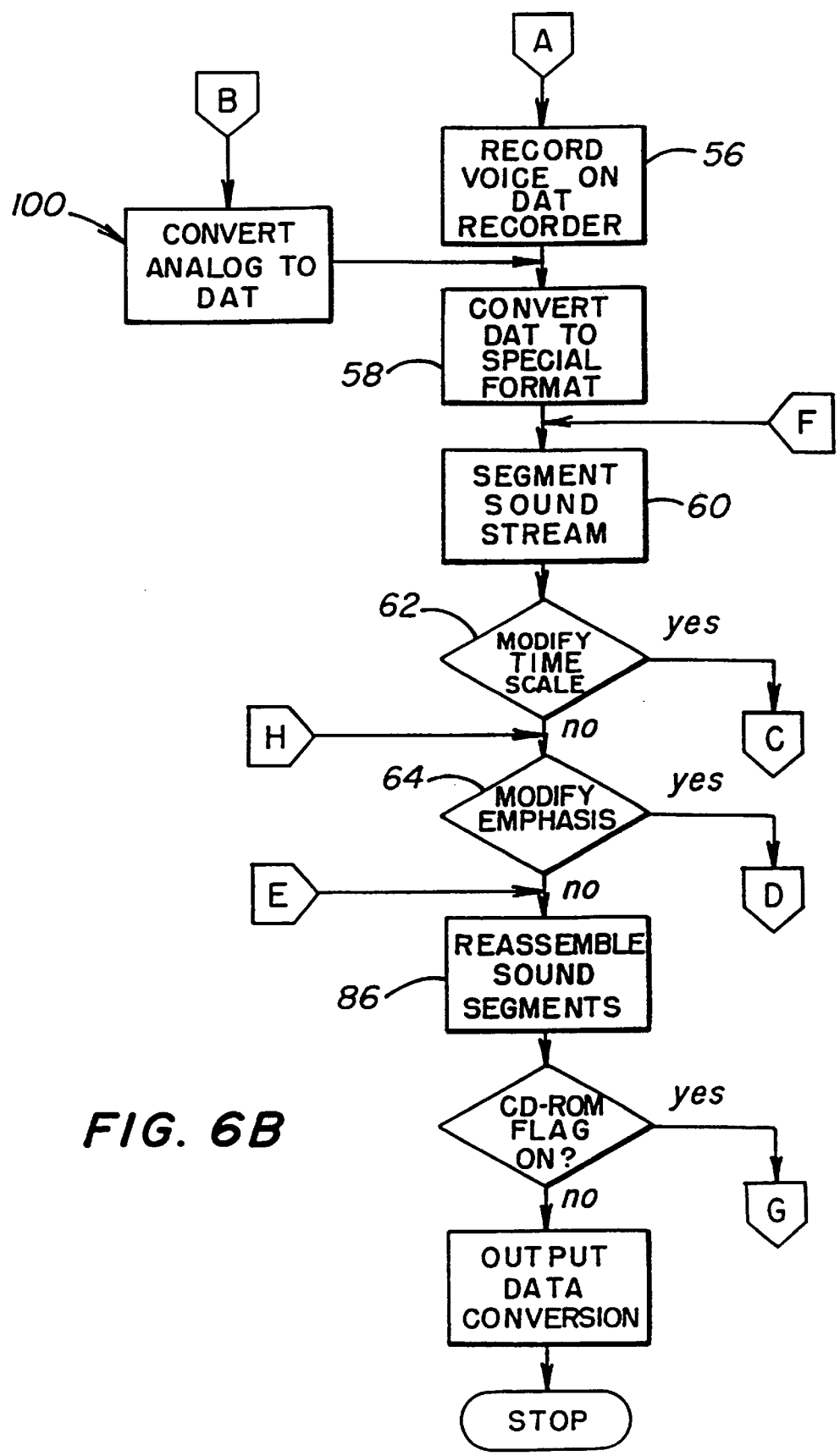

Assuming, in this instance, that test materials that are to be developed are selected in the decision block 50 illustrated in FIG. 6A, one is then directed to FIG. 6B, with the first step being to record the material on a digital audiotape recorder or DAT, the purpose being that speech modification cannot be readily accomplished in an analog mode.

The next step is to convert the digital audiotape to a special format which is adaptable to elongation of certain portions of the speech. The format used in developing this invention is the audio information file format or AIFF which was developed by Apple Computer and is supported by Silicon Graphics. This format supports a 16 bit file with a sampling rate of 22 kHz although other sampling rates and integer representations can be used (e.g. 8 bits, 11 kHz).

The next step indicated in operation block 60 is to segment the sound stream into subfiles that reduce computer memory requirements. Here again, in this invention the sound stream was segmented into 30 second subfiles but other lengths would be equally appropriate depending on available processor memory.

The user is then faced with the decision of whether to only modify the time scale, only modify the emphasis in the voice stream, or to do both. In the instance of modifying the time scale, one is directed to FIG. 6C for further direction. It is to be understood at this point that modifying the time scale is to elongate the stop consonants and other fast speech elements and, in the instance of the real time environment, to shorten the following or leading vowel sounds, or in other instances, to decrease the "dead" time that occurs between sentences and between words.

Figure 6C:
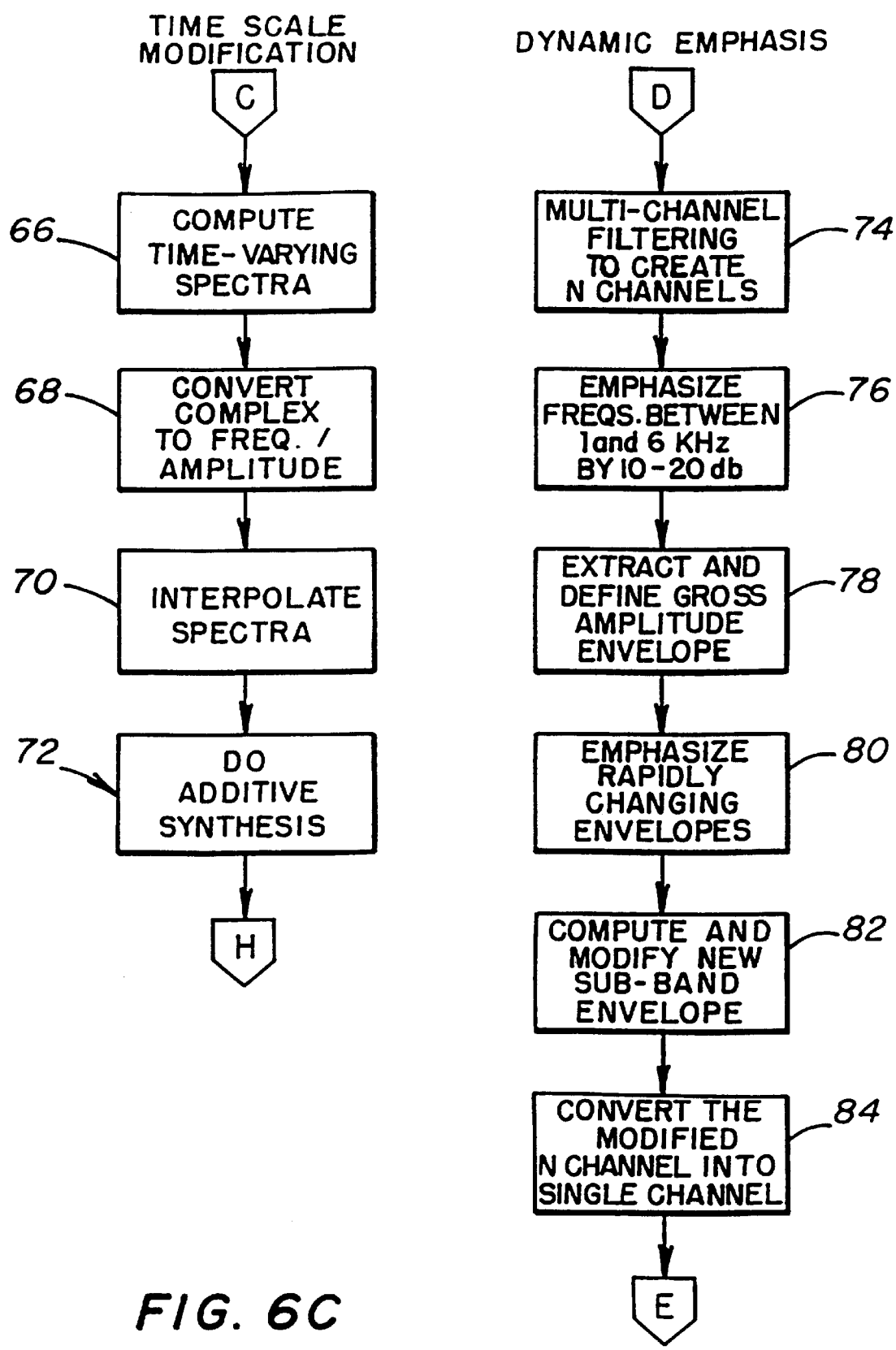
Figure 6D:
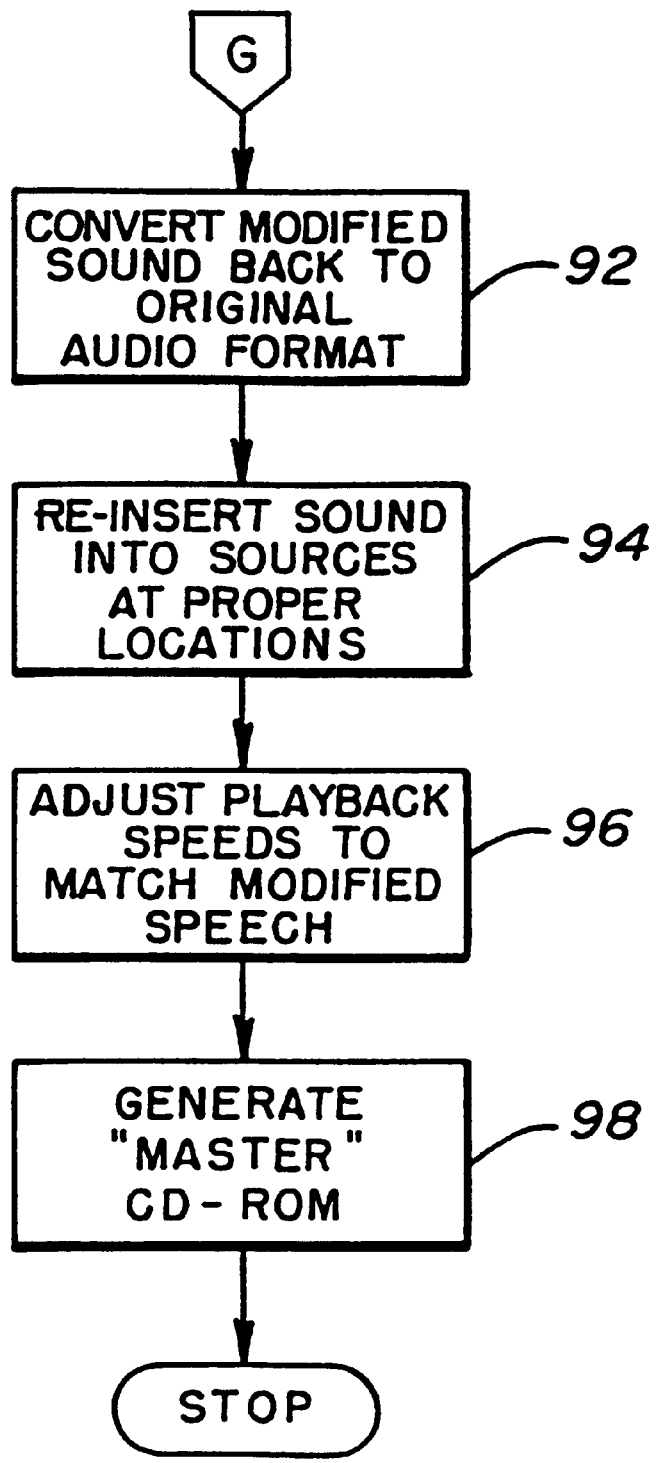

Referring now to FIG. 6C and operation block 66 the time scale modification first converts the incoming signal by means of a short-term Fast Fourier transform consisting of 128 simultaneous channels each represented by a complex spectra. The complex spectra in mathematical terms is a series of complex numbers each having a real and imaginary part, well-known in the electronic and mathematical fields, which is represented in the Fourier transform.

This complex spectra is then converted to frequency and amplitude as indicated in operation block 68. Once the spectra is converted to the frequency and amplitude representation indicated in block 68, the spectra is interpolated between successive short-term spectral time slices in order to create the desired expansion in the time domain in each frequency channel. That is, the given frequency and amplitude for a particular instance of time is compared to the two adjacent frequencies and amplitudes as determined by the Fast Fourier transform and a smooth transition in amplitude is created for each frequency channel. In this instance, the sound is literally spread out and additional information is inserted (interpolated) between each of the representations of the sound spectra in the Fourier transform. It has been found that a 50% increase in time is commonly adequate to accomplish the necessary change in the stop consonants coming through to the individual with the learning disability.

Thus, block 70 indicated in the interpolation of the spectra results in expansion of the time spectra. In like manner, if it becomes necessary to compress the time spectra, this can also be accomplished in this phase by deleting a particular set of Fourier transforms and then interpolating between the remaining adjacent transforms to smooth the curve.

After interpolation, an additive synthesis is accomplished as indicated in operation block 72. In is short, the additive synthesis step converts each of the frequencies and amplitudes back into the time domain or, in effect, performs an inverse Fast Fourier transform. Following the additive synthesis, each channel is put back into a time domain in a form such as existed prior to operation block 66. Following operation block 72, the program returns to the mainstream as shown in FIG. 6B to determine if emphasis should be incorporated into the speech. (See the decision block 64 in FIG. 6B.) Comparison of FIG. 4 and FIG. 5 shows a schematic representation of the elongation.

As noted above, two things can be accomplished in preparing speech and phonemes for use by individuals with a learning disability. One is to modify the time scale of the speech, which has just been discussed, and the second is to emphasize, by increasing the energy content, those portions of speech that contain rapid temporal changes in frequency content. It has been found that if the stop consonants such as the /ba/ or /da/ representations noted above are modified so that the energy of the consonant portion of the phoneme is increased, then improvement in the learning capability of an individual with a learning disability is also seen. In this instance, if emphasis is desired, dynamic emphasis is undertaken, as illustrated in FIG. 6C starting with multichannel bandpass filtering to create a number of separate frequency channels as indicated in operation block 74. In the present instance, the number of frequency channels has been selected at 40; however, a different number could be selected.

Filtering by Butterworth filters by the fourth order creates the 40 channels across a time interval of the previously segmented sound stream (see operation block 60), of which each segment consists of 30 seconds. In operation block 76 (FIG. 6C), all of the channels are filtered through a 1–6 kHz filter and provide for a 10–20 dB emphasis for frequencies that fall into the flat bandpass response between approximately 2–4 kHz. Subsequently, a gross amplitude envelope is extracted and defined for each of the 40 frequency band channels over each 30 second subfile as indicated in operation block 78. For those envelopes that show a rapid change (see operation block 80, FIG. 6C), the extracted envelopes are emphasized 10–20 db. It is pointed out that for consonants such as the examples of the /ba/ and /da/, the /b/ in the /ba/ and the /d/ in the /da/ as noted above will always exhibit a rapid change in the envelope of the frequency channels as opposed to the relatively constant envelope that is seen in a vowel block. The specific frequency channels for which a particular degree of emphasis is applied, the gross amplitude envelope frequency thresholds that marks the occurrence of a rapid change in the speech signal that triggers emphasis, and the degree of emphasis as a function of the rapidity (frequency) of gross amplitude envelope changes are all separately selectable. In the present application, a uniform emphasis of 10–20 dB was applied for the 2 to 4 kHz channels with gross amplitude envelopes with frequency components ranging from about 3 to about 45 Hz for natural speech, and from about 2 to about 30 Hz for 150% time expanded speech. Emphasis was progressively reduced as described above below 2 kHz, and above 4 kHz.

In order to create a new sub-band envelope as indicated in operation block 82, each channel is then modified by dividing by the information obtained in the initial gross amplitude envelope for each channel determined in block 78. For each channel, the resulting information is multiplied by the channel envelope developed in operation block 80. This produces an envelope modification function for each channel. Each channel envelope modification function is then multiplied channel by channel with the original channel signals defined in operation block 74. Additive synthesis is performed in operation block 84 such that the plurality of frequency bandpass channels can be converted via addition to a single channel across the entire frequency range contained in the digitized speech. Once the single channel is arrived at, then the program returns to FIG. 6B at connector E so that the sound segments determined in operation block 60 can be reassembled as shown in operation block 86.

Referring back to FIG. 6A, if a multimedia CD-ROM is present, then in decision block 54, it branches to an operation block 88 to identify the audio format in which the CD-ROM has been recorded. For example, CD-ROMs may come in any one of a number of formats, some of them being the Sound Resource Format, a Quick Time Format, a Paco Format, or the AIFF format which is used in the subsequent steps in this program. If the sound source is in some other format than AIFF, then it is converted to the AIFF format for operation in this program. (It should be noted that an equivalent program could be written to operate on other sound sources, just as well as the AIFF.) Further, the information must be converted to digital if it is analog. This is accomplished in operation block 88.

For convenience, a flag is set at this point indicating that the program is in a CD-ROM mode. The CD-ROM flag is set in operation block 90. The program then branches at connector F to the mainstream shown in FIG. 6B.

With the CD-ROM, the information is processed as indicated above, modifying the time scale and, if need be, applying the emphasis using exactly the same steps indicated above.

The sound is reassembled in operation block 86. At that point, the CD-ROM flag is checked and, if on, the program shifts to FIG. 6D, operation block 92, where the modified sound is converted back into the original audio format determined in operation block 88 (see FIG. 6A). The sound is then reinserted into the sources at the proper locations as indicated at operation block 94. That is, the video and/or animated graphics portions of the CD-ROM are synchronized with the modified sound portions.

Concurrently, the video and or animated graphics playback speeds are adjusted to match the modified speech as indicated in block 96. Alternatively, the modified speech can be placed in a real time mode, as indicated above, where the elapsed time of the speech in the modified version is identical to the elapsed time in the speech in the original version so that the motion and the like on the CD-ROM correspond to the original version. Finally, a master CD-ROM is generated, as indicated in operation block 98, and the program is completed.

Referring back to FIG. 6B, the output data is then converted back into analog tape for the "Books on Tape" or for tests that can be administered using analog tape. Alternatively versions of the tests and associated test graphics can also be placed on the computer in digital form where they can be administered under computer control.

It should be noted that the "Books on Tape" is a voice only situation, and corresponds exactly to the test material version once the "Books on Tape" is converted to a digital audio tape indicated in block 100. Following that conversion to digital audio tape, the program follows the exact same steps as in the test material.

Operation of the preferred embodiment is exemplified in the following experiment, which used the aforedescribed material.

Experiment—Procedures Used for Remediation Studies

Subjects

Seven children with specific developmental language based learning disabilities (L/LD) participated as subjects in this study. L/LD children were selected who were without other primary sensory, is motor, cognitive, emotional or neurological impairments, and who met the following criteria: 1) nonverbal performance IQ of 85 or better on the Weschler Intelligence Scale appropriate for age; 2) at least 1.5 standard deviations below the mean "predicted" achievement level on the age appropriate form of the Test of Language Development; 3) at least 1.5 standard deviations below the mean for age and gender on the Tallal Test of Auditory Processing; 4) normal hearing acuity, no motor handicaps, no oral, motor or structural impairment effecting nonspeech movements of the articulators; 5) no obvious signs of infantile autism, emotional difficulties or evidence of frank neurological disorders (seizures, hemiplegia etc.).

Schedule

The remediation study lasted six weeks with children receiving direct training 3 hours per day, 5 days a week at the Rutgers University Experimental Summer School, and doing 1 to 2 hours of homework per day 7 days a week.

In weeks 1 "Benchmark" testing was done to determine each child's entry level ability on a series of standardized speech and language measures as well as their temporal processing thresholds. Standardized speech and language tests were tape recorded, but otherwise given according to standardized format. if more than one form of the test was available, form A was always used. No acoustic modifications were used when recording or giving the "Benchmark" tests. Test performance was scored using standardized procedures according to the test manuals. In addition to these standardized speech and language measures, the Tallal Test of Auditory Processing (Repetition Test) was given to establish temporal thresholds. Results of week 1 testing will be referred to as "pretest". In week 6, all of the "benchmark" measures were repeated. The results of week 6 testing will be referred to as "post test".

In weeks 2 through 5 remediation training was given. Each child rotated through a series of 20 minute training sessions separated by two 20 minute break/snack sessions. Sessions were scheduled in such a way as to assure that each child completed each 20 minute computer game session (sessions A, B) and story on tape or CD-ROM (session C) once a day. Each of the receptive phonology and grammar sessions (sessions D, E, F, G and K) were given twice a week. The expressive speech and language sessions (session H, I and J), in which the children had to repeat verbatim what they heard in a series of real or nonsense syllables, words and sentences, were given once a week.

For the training sessions C through K above, materials were tape recorded or obtained directly from CD-ROM disks and subsequently the audio signal was computer modified using the expansion and emphasis processes described in the invention. These modified tapes were then used in all subsequent training sessions during weeks 2 through 5 both during the laboratory and homework sessions. For those training sessions that were using materials from standardized speech and language tests, a completely different form of each test (form B) was constructed to assure that specific vocabulary and test items were not being trained. Rather, the training aimed to broadly remediate perception and production of phonological contrasts, knowledge of syntactic and morphological rules, and verbal memory skills.

For receptive phonology and grammar sessions (session D, E, F, G and K) each processed speech command was presented and subjects were required to select one of several pictures which best represented the speech command (for example "Point to the book that is under the table"). Once the subject had responded, the experimenter indicated whether the response was correct with a "thumbs-up", or "thumbs-down" gesture. Regardless of whether the response was correct or incorrect the experimenter would point to the correct picture and also draw the child's attention to the portion of the picture which held the most salient information. Next, the same command was presented again so that the subject could hear it this time with advanced knowledge of the correct response. For expressive speech and language sessions (sessions H, I, J) processed material was presented for verbatim response with no feedback or repetition.

Each child in the study completed the following schedule. Benchmark measures (unprocessed speech using form A) were given in week 1 (pretest). Training sessions were given in weeks 2 through 5 which included computerized training games, and exercises using processed speech and language materials (form B), and processed storybooks and interactional educational materials on tape and/or CD-ROM. Benchmark measures were given again in week 6 using unprocessed speech form A. No specialized training was given in week 7 through 11 (although the children returned to their regular school classes during this time. The children were brought back to the laboratory in week 12 at which time the benchmark measures were given once again. Week 12 testing results will be referred to as "post-post testing".

Methods
Benchmark Measures—Given in weeks 1 (pretest), 6 (post test) and 12 (post-post test) Tallal Test of Auditory Processing - (The Repetition Test, Tallal, 1980): In the Repetition Test, two different stimuli (stimulus 1 and stimulus 2) are used in combination. Using operant conditioning procedures, subjects are trained to "repeat" each stimulus they perceive by pressing either of two identical keys on a response panel, which are mounted one above the other. For trials that are comprised of more than one stimulus, subjects are required to "repeat" the pattern by pressing the appropriate response keys in the order of stimulus presentation. The Repetition Test is comprised of a hierarchical set of subtests that build successively one upon the other. These subtests allow for the investigation of 1) detection, 2) association/discrimination, 3) sequencing, 4) processing rate and 5) serial memory. Beginning with the Detection subtest, subjects must reach a set criterion of correct responses in order to progress to the next highest subtest. A score is received for each subtest. In addition a composite score for performance on all subtests completed is given. 1). Detection—The subject is initially presented with a single item (stimulus 1). The Experimenter (E) demonstrates that the bottom key on the response panel is to be pressed every time stimulus 1 is presented. The subject is encouraged to respond and training continues until five correct responses to this stimulus have been made. Next, the same procedure is repeated with the other stimulus (stimulus 2) and the subject is trained to press the top key of the response panel. The number of trials correct is recorded for stimulus 1 and stimulus 2.

2) Association/Discrimination—Stimulus 1 and stimulus 2 are presented one at a time, in random order. The subject is trained to press the bottom key each time stimulus 1 is presented and the top key each time stimulus 2 is presented. Stimulus 1 and 2 continue to be presented one at a time in random order, with immediate correction of errors, until a criterion of 10 out of 12 correct responses in a series of 16 consecutive stimuli (P<0.002, Binomial Test—Siegel, 1956) is reached. This very strict criterion is employed as it is imperative to ensure that each subject can discriminate between stimulus 1 and 2, and has fully established the correct association to each of the two stimuli before proceeding to the more complex tasks, which utilize combinations of these two stimuli. The number of trials to criterion and number of correct responses are recorded. If after twenty-four trials, a subject fails to reach criterion, the test is terminated at this point.

3.) Sequencing—Subjects that reach the criterion on the Association subtest, are next trained to respond to stimulus 1 and 2, presented sequentially, with a 500 msec interstimulus-interval (ISI). The four possible stimulus patterns (1-1, 2-2, 2-1, 1-2) are presented in random order. The subject is required to wait until both stimuli have been presented and then press the correct response keys in the same order as the stimuli are presented. For each subject the method is demonstrated four times by the E. Then, 12 test trials are given. During these trials, up to three errors are corrected. The score on this subtest is the total number of correct responses.

4) Processing Rate—The same series of two-element stimulus pairs as were used in the Sequencing subtest are presented again. However, in this subtest the duration of the ISI is progressively reduced using an up/down staircase procedure to establish a psychophysical threshold, based on subject's responses. Subjects are given two practice trials before beginning this subtest.

5) Serial Memory—Slow ISIs (500 msec)—In this subtest, the same two stimulus elements will be used and the procedure will be the same as for the previous sequencing subtest, except that the number of elements in the stimulus patterns will be increased. These stimulus patterns will consist of 3, 4, 5, 6, or 7 elements, composed of random combinations of the two stimulus elements. The subject is given a stimulus pattern incorporating 3 stimulus elements (i.e., 1-1-2). The experimenter will demonstrate that the response panels are to be pressed 3 times in the corresponding order in which the stimulus elements occurred. Then, additional 3-element patterns will be presented and the subject will be instructed to wait until the entire pattern has been presented and then make the appropriate response to that stimulus pattern. Each subject will be given five, 3-element patterns. If the subject responds correctly to three of the five patterns, the same procedure will be repeated with the next highest. pattern length. If, however, the subject fails to respond correctly to three out of five patterns at any pattern length, this subtest will be terminated. A single score for the Serial Memory—Slow subtest will be obtained. This score will be made up of the total number of stimulus elements responded to correctly out of 125 ($5 \times 3$'s+$5 \times 4$'s+$5 \times 5$'s+$5 \times 6$'s+$5 \times 7$'s).

6). Serial Memory—fast ISIs (10, 70 msec)—For each stimulus length on which a subject responded correctly on three of five trials on the Serial Memory subtest with 500 msec ISIs, five additional trials will be given with ISIs of 10 and 70 msec. A single Serial Memory—Fast subtest score, combining all of the fast ISI trials, will be calculated similarly to the slow ISIs.

In this study the Repetition Test was given with nonverbal auditory stimuli. Two different computer generated complex tones were used. Stimulus 1 had a fundamental frequency of 100 Hz and Stimulus 2 a fundamental frequency of 300 Hz. Thresholds were established for each subject with tone durations of 150 msec, 75 msec, 40 msec and 17 msec, respectively. The Serial Memory subtests were not given.

The test is administered via computer. Computer software insures standardization of stimulus presentation, response recording and scoring and threshold tracking. Auditory stimuli are presented binaurally over earphones at a constant super-threshold level (approximately 65 dB hearing level).

Receptive Language Tests

Token Test (DiSimoni, 1978): The Token Test was originally developed to assess receptive language deficits in adult aphasia. The test has been used extensively in research and has proved highly sensitive to receptive language impairments in both children and adults, and also to continued difficulties in adults with a documented childhood history of L/LD. The Token Test utilizes large and small circles and squares of five colors. The test comprises four subtests of increasing memory load and a fifth subtest with increased grammatical complexity. After determining that each subject is familiar with the test vocabulary, the test begins with simple commands (i.e., touch the red circle). Each subsequent subtest gives commands with increasing memory load (i.e., touch the big red circle; touch the red circle and the yellow square). In part 5, the commands add grammatical complexity (i.e., instead of the blue square pick up the white circle, etc.). The number of correct responses on each subtest, as well as the total correct composite score are recorded.

Bishop Test for Reception of Grammar (TROG) (Bishop (1979): Bishop has spent many years developing TROG, a rapid measure for assessing receptive language. This measure has proven highly sensitive in assessing receptive language disorders in children, as well as in adult aphasics. TROG is an individually administered multiple choice test designed to assess understanding of grammatical contrasts in English. The test consists of 80 items. In each item the subject is required to select from a 4-choice array the picture that corresponds to a phrase or sentence spoken by the E. The test is divided into blocks of four items, each block testing understanding of a specific type of morphological or syntactic contrast. The test is scored in terms of the number of blocks passed, with the criterion for a pass being that all four items in that block are responded to correctly. Contrasts are arranged in order of increasing difficulty. Testing is started at a baseline of 5 consecutive blocks correct, and is discontinued when five consecutive blocks have been failed. The test has been standardized on over 2,000 British children aged from 4 to 12 years, and tables for converting raw scores to standard scores are provided in the test manual. Scores of normal adults approach ceiling levels. Research by Abbeduto, Furman & Davies (1989) has demonstrated that the test is suitable for American as well as British subjects.

Curtiss and Yamada Comprehensive Language Evaluation (CYCLE) (Curtiss and Yamada, 1980): CYCLE is an instrument which can be used to assess receptive and expressive language in a comprehensive manner that far surpasses any previously available language assessment battery. Though not available yet commercially, research data have been collected on over 70 normal children at ages 2 through 8 years, and 100 language impaired children at ages 4 through 8 years. Considerable reliability and validity data on the test are available. CYCLE includes three batteries: 1) Receptive, 2) Elicitation and 3) Free speech analysis. Only the receptive battery (CYCLE-R) was used in this study.

Items from the CYCLE-R were used to test receptive knowledge of phonology, lexical and relational semantics, inflectional and grammatical morphology, and syntax. The test is comprised of a set of items which cover the age range of 2–9 in each linguistic area mentioned above. In scope of language areas and age range covered, it is the test most ideally suited to this study. Each item on the test includes vocabulary that is easily picturable and familiar to young preschool children. Each item also, when possible, tests only one grammatical element or structure, so that comprehension of each aspect of the grammar can be ascertained separately. Since knowledge of complex structures entails knowledge of the component simple structures involved, all test items are developmentally arranged, and more complex items are administered only after a child has passed the items preceding it in level. Every item involves five example sentences; thus each structure is tested enough times to establish performance consistency, and there is some insurance that chance alone will not allow a child to perform well. Each example sentence has enough choices in the response array to further ensure that a child cannot reach a passing criterion on an item by chance.

The CYCLE-R incorporates several features which make it a well-designed receptive measure for testing young children. Each item involving pictures uses decoys consisting of the identical elements mentioned in the test sentence, but in a different relationship from that of the correct test picture. In addition, decoys which allow the examiner to determine if the child has attended to only the first or last part of the test sentence are also included. Extra linguistic and redundant linguistic cues have been eliminated from all items. Thus there are no cues in the test array or in the test sentences themselves that aid test performance. All pictures are clear, simple line drawings which directly represent the relevant information; i.e., no interpretative load is placed on the child. In addition, there is a clear separation between all pictures in an array, and all illustrations are large enough for children to see and interpret. There is never a time when more than one choice in a picture array is tested, so that process of elimination cannot be used to aid performance. Correct choice as well as all decoy choices are randomized throughout an item; e.g., correct choice occurs in each array position equally often. Each distinction is tested by more than one token or lexical item reflecting that distinction. CYCLE performance yields a raw score which can be converted to age equivalent scores based on normative data.

Goldman-Fristoe-Woodcock (GFW) Test of Auditory Discrimination (Goldman, Fristoe, and Woodcock, 1970): This test was designed to assess speech-sound discrimination of single syllable words under controlled listening conditions for children 3 years 8 months through adults. The test consists of two parts: 1) pretest to determine knowledge of test vocabulary; 2) auditory discrimination of single words through picture pointing format. The subject listens to a word presented on a tape recorder (for example—lake) and must select from four pictures. (lake, rake, wake, snake) the picture representing that word. All minimal pair speech sound contrasts are assessed for discrimination in this test.

Expressive Language Tests

Golaman-Fristoe Test of Articulation (Goldman & Fristoe, 1986): The Goldman-Pristoe Test of Articulation provides a systematic and comprehensive measure of a child's ability to articulate the consonant sounds present in speech. Its results provide a measure of all the necessary phonemes and determine which sounds are produced incorrectly, as well as the type of misproduction. The sounds in words subtest which uses a series of pictures to elicit the major speech sounds in the initial, middle or final position was administered to each child. The test manual provides normative data for ages 2 through 16 years.

Memory for Sentences Subtest (Stanford-Binet Intelligence Scale; Thorndike, Hagen, & Sattler, 1986): This subtest measures the ability to recall meaningful sentences. The subject hears each sentence and is required to immediately reproduce the sentence verbatim before continuing. Each sentence is scored Pass/Fail and testing is discontinued when three of four sentences are failed. Sentences increase in syllable length and syntactic complexity with increasing items. Normative data are provided for ages 2 through 23 years.

CELF—Recalling Sentences Subtest (Semel & Wiig, 1980): The Comprehensive Evaluation of Language Functions (CELF) language battery has been standardized on a large sample of children in the USA aged from 6 to 16 years. After a demonstration item and a practice item, the subject is required to repeat verbatim a series of 26 sentences of increasing length and complexity, and the response is awarded three points for correct repetition, 2 points if there is one error, 1 point if there are 2 to 3 errors, and zero points for 4 or more errors. Testing is discontinued after 4 consecutive zero scores. The test manual provides tables for converting scores to scaled scores.

Training Sessions

Eleven training sessions were developed specifically for this study. Sessions were given in twenty minute periods in random order according to the schedule described above. Two sections (sessions A and B) use computer game formats already described in detail as embodiments of this invention (see above) and so will only be described briefly here. The other sessions (sessions C through K) use taped or CD-ROM speech and language segments in which the acoustic waveform was computer expanded and enhanced using the methods described in detail as embodiments of this invention (see below).

Session A—Nonverbal Temporal Sequencing Training

An interactive multimedia game mounted on a CD-ROM (Circus Sequence Game) was used to train temporal order sequencing of nonverbal sounds (e.g. frequency modulated sweeps and steady state tonal complexes) at faster and faster presentation rates. The nonverbal stimuli were constructed specifically to represent components of human speech. For example, the rate changes, the starting and ending frequencies and the stimulus duration of the frequency modulated sweeps were similar to single consonant formants in normal human speech. Similarly, the steady state tonal complexes were constructed to mimic vowels in human speech. Subjects were trained to listen to a 2-element stimulus sequence, which was selected at random from four possible 2-element stimulus sequence combinations, in which the stimulus elements were separated by a brief interstimulus interval (ISI) (see FIG. 2). Subjects were required to respond by pushing panels on the touch screen of a computer to indicate the order of stimulus presentation (see FIG. 3). Correct responses were reinforced by a presentation of a single brief sound that was always associated with a correct response, earning a point which was displayed as a cumulative score on the video screen. In addition, when three correct responses in a row were obtained, this string of correct responses was rewarded by a brief animation selected from a large pool of animation sequences. The high quality and wide variety of animations served to maintain interest in playing the game. The program itself used an adaptive tracking procedure in order to determine the interstimulus interval for subsequent stimulus sequence presentations. That is, as the subjects succeeded at identifying the stimulus sequence order, the task was made progressively more difficult by reducing the interval between the two stimuli.

Session B—Syllable Discrimination

An interactive multimedia game mounted on a CD-ROM (Phoneme Clown Game) was used to train syllable discrimination using minimal phoneme pairs. Both normal phoneme pairs and modified phoneme pairs where specific aspects of the acoustic signal had been computer modified to enhance temporal cues were used in this training exercise. In addition, the interstimulus interval between the two phoneme pairs was systematically varied in duration. This provided experience and training at different phoneme presentation rates. The computer screen displayed a circus scene that included three clown faces. Initially, a single clown face appeared on the left of the computer screen. Subjects initiated each trial by touching this clown face. Once touched, this clown said a specific syllable (eg., /ba/) and the uppercase letter B appeared over the clown's face. Next, the left most clown disappeared and two new clowns appeared on the screen and two more syllables were presented one after the other. The subject's task was to determine whether the first or second syllable matched the sound and letter produced by the first clown. L/LD children indicated their response by touching the first or second clown which appeared on the right side of the computer screen. Correct responses caused the target letter (e.g. B) to appear over the face of the touched clown and were rewarded by a wide variety of computer animations, "reward sounds", and points. A cumulative point score was displayed on the computer screen. If incorrect, no reward was given and the subject proceeded to the next trial. In addition, after completion of each 50 blocks of trials a brief video clip from an age appropriate animated movie appeared embedded in the game screen. These video clips were sequential so that continued practice resulted in presentation of the next segment of the animated movie.

Session C (Listening to Stories)

Popular storybooks for children (eg. Disney's and Seuss books) were tape recorded on a digital audio tape recorder (i.e. DAT). Next, the digital audio tape was transferred to a computer in digital form so that elongation and enhancement of certain portions of the speech waveform could be performed, as described in the embodiment of the invention sections above. Alternatively, commercially available interactive multimedia CD-ROM children's stories were used. The digital audio portions of the CD-ROMs were extracted and transferred to a computer so they could be processed as described above. Once modified, the audio signals were converted back into analog tape for the "books on tape" versions or reinserted in the appropriate digital formats for the CD-ROM stories and new CD-ROMs containing the modified speech were produced. It was these speech modified A books on tape, and CD-ROM. based stories that were used in this training session. Subjects selected a story of their choice and listened to them during at least one 20 minute session per day at the laboratory, either on tape with an accompanying book or on CD-ROM. Each day, each child checked out tapes and accompanying books or CD-ROM based stories from the laboratory "library" to take home to listen to as homework for one to two hours per night. The materials were returned the next day or after the weekend and new stories were selected for the next night or weekend's homework allowing the stories to rotate between the children, increasing the variety available. Subjects received 50 points for each story they listened to. Parents kept track of these points for homework sessions so they could be added to the child's weekly points score.

Session D—Receptive Grammar Training—(CYCLE Format)

The CYCLE format was used for training specific elements of receptive grammar. For each item of the original CYCLE (form A) a new item was selected in order to develop a new series of items to be used in training (form B). Items were selected so that vocabulary and content were changed but the essential semantic, syntactic and morphological elements remain the same. Take for example the sentence "the fish are swimming" which appears on the CYCLE form A. The child must select between two pictures one which shows a single fish swimming and the other which shows several fish swimming. To respond correctly the individual must know that in this case the verb carries the plural information and therefore the only correct answer is the picture with several fish. This differs from most other forms of pluralization such as occur in the sentence "the dogs are running" where information about pluralization occurs both in the noun "dogs" as well as the verb "are". For the training component, an equivalent sentence was developed in which pluralization was carried solely by the verb "the deer are eating" which appeared on form B. All items were similarly converted to maintain the grammatical component essential to comprehension while altering the vocabulary, thus assuring that not merely training knowledge of a specific item was achieved but rather grammatical rules were also followed. Form B items were tape recorded and subsequently subjected to computer modification of the acoustic waveform using the procedures described above.

During training, subjects were asked to point to the picture that represented each command. They received immediate feedback indicating correct or incorrect responses (i.e.,"thumbs up" or "thumbs down"). Regardless of whether the response was correct or not, the command was repeated again so that they could listen to it directly after the experimenter had indicated which was the correct picture. Subjects received a sticker to be placed on a wall chart for completing this session.

Session E—Receptive Memory Training (TOKEN Format)

The TOKEN test format was used for training receptive memory. Using the same procedure as described above, items from form A of the TOKEN test were modified to develop a new set of items which made up form B. For example, the item "touch the large red circle and the small green square", which appears on form A of the TOKEN test, was changed to "touch the small yellow square and the large blue circle" for form B. The new form B items were tape recorded and computer modified in the same manner described above. Training included two repetitions of each item with feedback, also as described above. Subjects received a sticker to be placed on a wall chart for completing this session.

Session F—Receptive Grammar Training (TROG Format)

The TROG test is similar in format to the CYCLE. The identical procedure was followed for developing a form B of this measure and computer modifying the acoustics for use in training as described above. The training procedure and reinforcement was. the same as that used for the CYCLE and TOKEN session.

Session G—Receptive Phonology Training (GFW Format)

The GFW format was used to train receptive phonology. Here the, subject listens to a word presented via a tape recorder and points to the picture that represents that word, amongst other pictures which represent words which differ by only one distinctive feature of speech. Using a similar procedure to that described above, an alternate form (form B) was developed for training receptive phonology. The new items were tape recorded and modified accordingly for presentation during the training sessions. Once again, subjects received each item twice with the second repetition being given with prior knowledge of the correct response. Subjects received a sticker for reinforcement.

Session H—Sentence Imitation Training (CELF Format)

Items from the CELF sentence imitation subtest were modified in a manner similar to that described above to develop items for form B. However, for these items, specific and careful attention was paid to selecting words which had equivalent frequencies in the language, and roughly similar phonological complexity. Form B items were then tape recorded and modified in the manner described above. Subjects were presented these new modified sentences and asked to repeat them verbatim. No feedback was given. All errors, including phonological production errors, were scored. The CELF includes both grammatically correct and grammatically incorrect sentences for repetition. Separate scores for each of these types of items are analyzed.

Session I—Expressive Memory Training (Memory for Sentence Format)

The Memory for Sentence subtest of the Stanford-Binet was used as a model for developing training items for this session. This session is identical to session k above (CELF) except that only grammatically correct sentences are used. The procedures followed for item development, stimulus modification and testing, procedures are identical to those described above.

Session J—Repeating Real and Nonsense Syllables and Words.

A list of nonsense syllables and words were developed specifically for this study. Careful attention was placed on acoustic and phonetic characteristics of the stimulus set. The goal of this training was to determine whether acoustic alteration of the input would result in improved articulatory coding of speech output at the acoustic, phonetic and phonological levels of analysis. It was of particular is interest to determine whether training, using materials in which the acoustic temporal cues had been altered, would result in improved control of these same temporal cues in speech production.

Session K—Receptive Grammar Training (Simon Says Format)

A Simon Says game format was used to train receptive grammar and memory. Items were developed specifically for this training which were similar to those appearing in several of the other receptive language training sessions. However, in this format, instead of responding by selecting appropriate pictures or pointing to static circles and squares, subjects were required to act out each command using a series of props. Training items were developed and tape recorded and subsequently computer modified using the same acoustic modification described above. Some items began with "Simon Says" which was the child's instruction to do exactly what Simon said to do. To enhance the fun of the game, items were inserted without the prephrase "Simon Says". These were followed by phrases such as "don't let me catch you, wait for Simon". Items were specifically constructed requiring individual phonological contrast (eg. "touch your nose" vs. "touch your toes") or grammatical contrast (such as, "hop on your foot" vs. "hop on your feet"). Sequential commands were also included, such as "touch your nose, shoulders, toes and knees". Other items were constructed to train receptive memory, such as "run around the large blue crayon and then pick-up the small yellow spoon" (where large and small crayons and spoons of various colors were available as props). Some of these commands were proceeded by "Simon Says" while others were not. Once again, as was the case with each of the other receptive language training sessions, each command was repeated twice with feedback given after the child's response to demonstrate the correct action if the child was incorrect. This was followed by a second opportunity to hear and act out the command with prior knowledge of the correct response.

Reinforcement

In order to maintain motivation throughout the program, a series of point and sticker based reinforcement systems were developed. The computer games used each day in sessions A and B had a points and sticker won ongoing total built into the program which were displayed on the screen in a cumulative fashion after each response. In addition, intermittent computer animations and movie clips were used to maintain interest in these training games. The points and stickers won by playing the computer games were transferred at the end of each day, as a group activity, to a decorated wall chart that tracked each child's accumulations week by week. At the end of each week, the children could use these points to "buy" toys from the "Circus Store". The store contained toys marked with "prices" which corresponded to numbers of points earned.

In addition to these weekly prizes the children earned stickers for completing each of the other 20 minute training sessions. Unlike the point system used in the computer game, however, these were not performance based but rather indicated completion of a session. These "special stickers" were placed on a chart so the child could monitor their progress through these training sessions each week. Once a chart was filled (indicating that the child had completed the requisite number of sessions for that week) they could select a toy or food item from the "Listening Store" or "Speaking Store". These reinforcers, together with personal attention and reinforcement by the experimenters, proved highly successful in maintaining motivation throughout the six week program.

Results

Figure 7:
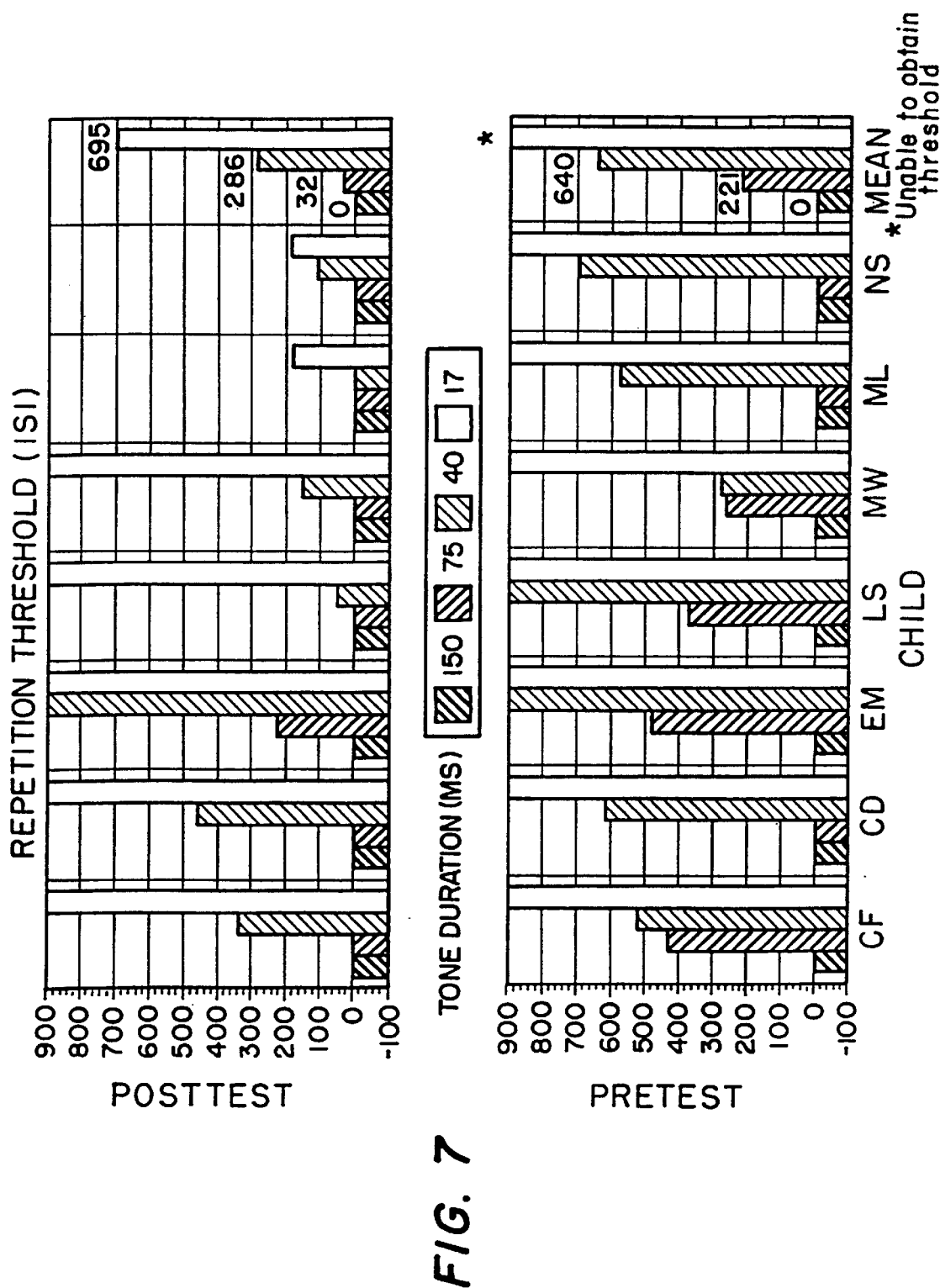
FIG. 7 are graphs of the results of the Tallal Repetition Test before and after training of seven selected L/LD children.
Figure 8:
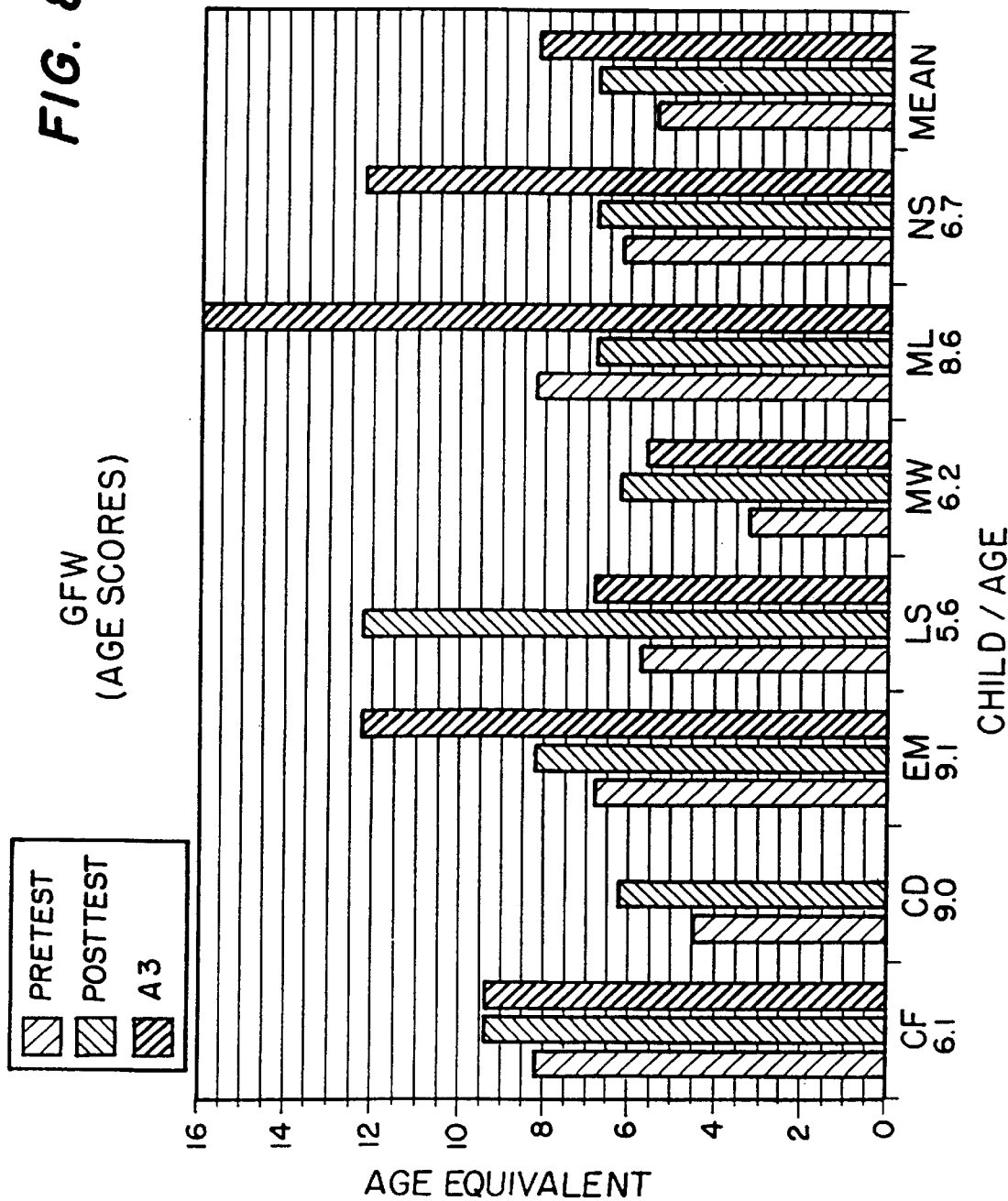
FIG. 8 is a graph of the results of the GFW test of auditory discrimination for the seven L/LD children showing the actual age plotted against the age equivalent both for pretest, post-test and three months after the training session, where available.
Figure 9:
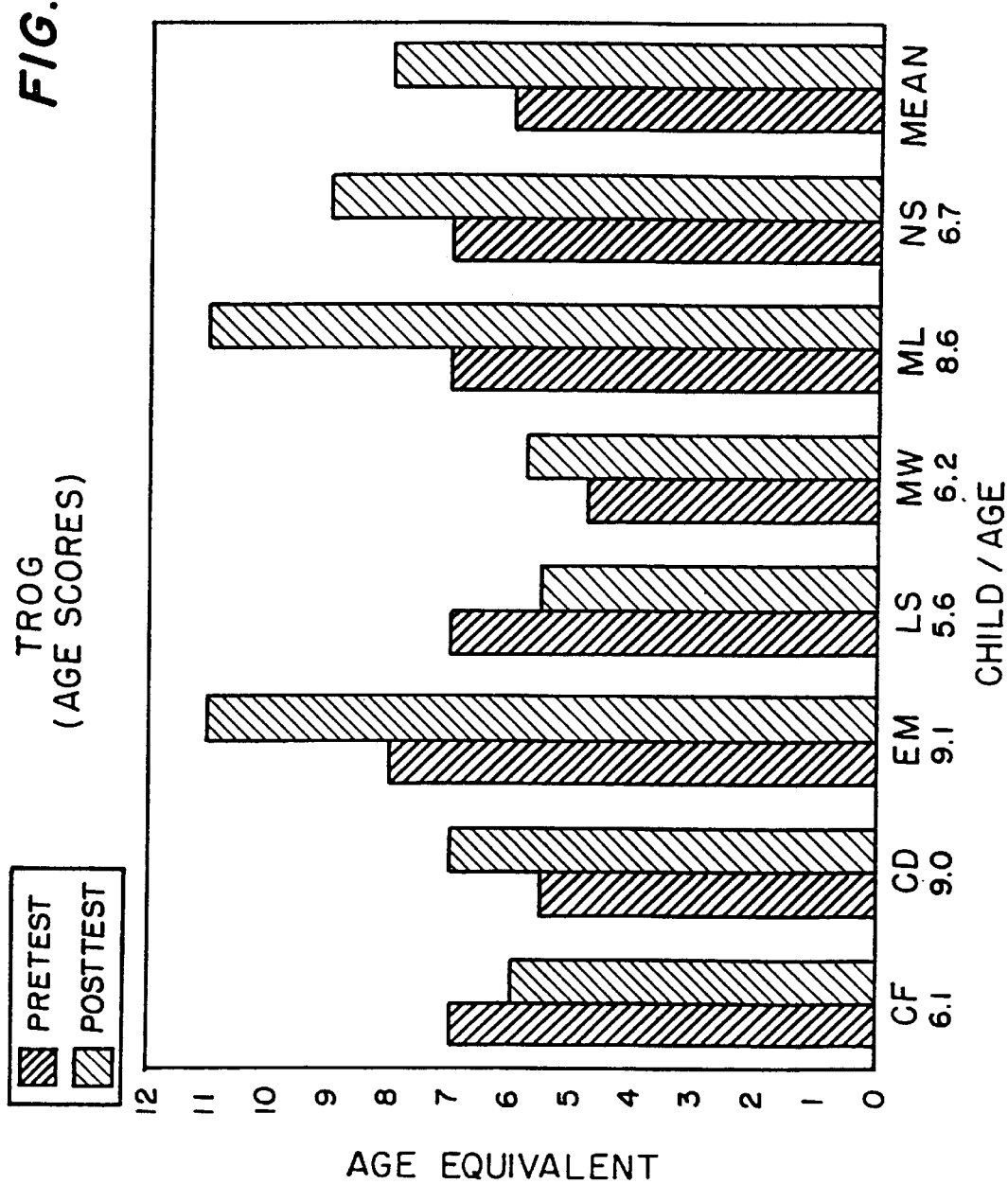
FIG. 9 is a graph of the results of the TROG (Test for Reception of Grammar) for the pretest and post-test times, showing the equivalent age of the seven L/LD children.
Figure 10:
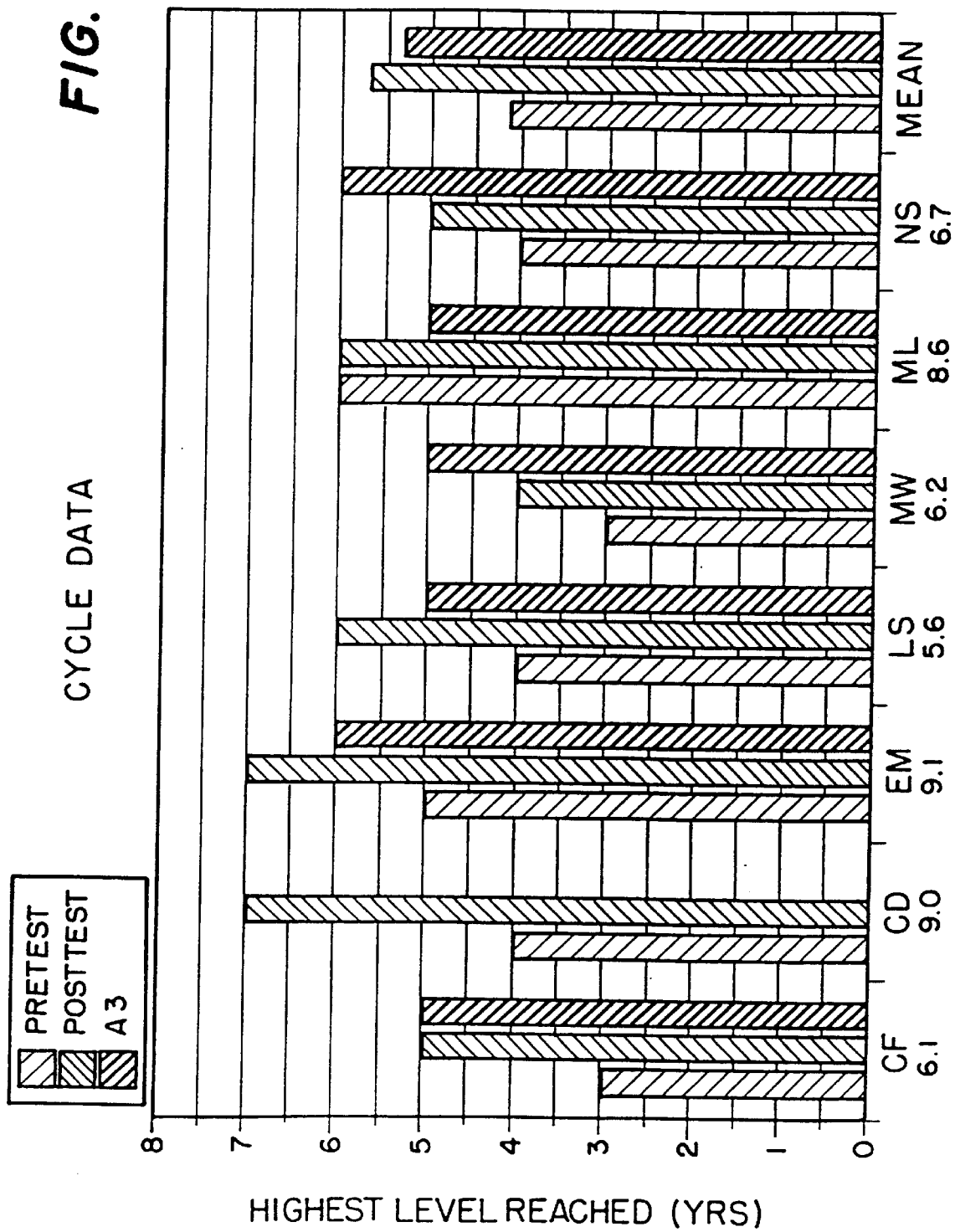
FIG. 10 is a graph of the results of the Comprehensive Language Evaluation (CYCLE) test for the seven L/LD children for the pretest and post-test times and, where available, three months after the training.

Two training procedures were employed in this study. First, an attempt was made to alter the highly impaired temporal thresholds that the L/LD children demonstrated in week 1 (pretest) by selectively training temporal integration rates daily during weeks 2–5 using the Circus Sequence CD-ROM game format described in the embodiment of the invention. The Tallal Repetition Test was given in weeks 1 and 6 as the benchmark measure used to assess change in temporal processing thresholds. As can be seen in the bottom of FIG. 7, at pretest (week 1) each child demonstrated the ability to perform the two tone sequencing subtest of the Repetition Test using 150 msec duration tones with 0 msec ISI. This demonstrates that each child understood the task and could respond at a high level of accuracy when sufficiently long duration stimuli were presented. However, when the duration of the stimulus was reduced to 75, 40 or 17 msec respectively, the L/LD children's performance deteriorated. Recall that normal control 6–8 yr. old children only require 8 msec between two 75 msec tones. In contrast the L/LD children required an average of 221 msec. Similarly, the L/LD children showed progressively greater deficits as the duration of stimulus presentation was decreased to 40 or 17 msec.

The results following four weeks of training on the Circus Sequence game are dramatic. As can be seen in the top of FIG. 7 (week 6 post-test) temporal processing thresholds for each child were substantially reduced. Group totals also reflect this marked improvement. For example, using 75 msec tone durations, the average ISI for the group went from 221 msec at pretest to 32 msec at post test, a temporal processing rate much closer to the normal range of 8 msec. Similarly, the mean threshold for 40 msec duration tones went from 640 msec at pretest to the post training rate of 286 msec, again a highly significant improvement.

These data provide strong evidence of the efficacy of the temporal training procedure (Circus Sequence game), embodied in this invention, for the modification of temporal integration deficits in L/LD children.

The second training procedure developed in this invention utilized computer extended and enhanced speech to train speech and language functions. Of specific interest was whether the rate of development of basic phonological processes as well as higher level linguistic abilities (morphology, semantics, syntax) could be enhanced through training with computer modified acoustic input. It was hypothesized that the acoustic modifications that were made in the fluent speech used for training would result in the greatest improvements in receptive aspects of speech (phonology) and language comprehension. This hypothesis can be directly tested by comparing week 1 (pretest) to week 6 (post test) performance on each of the benchmark tests of receptive phonology and language processing. In FIGS. 8 through 11, data are presented first for each of the individual subjects participating in the study, followed by the average or means for each of the benchmark receptive language tests. When available in the test manual, based on standardized normative data for the test, age equivalent scores have been presented. When age equivalents are not available, percentiles for age or raw scores are presented.

Figure 11:
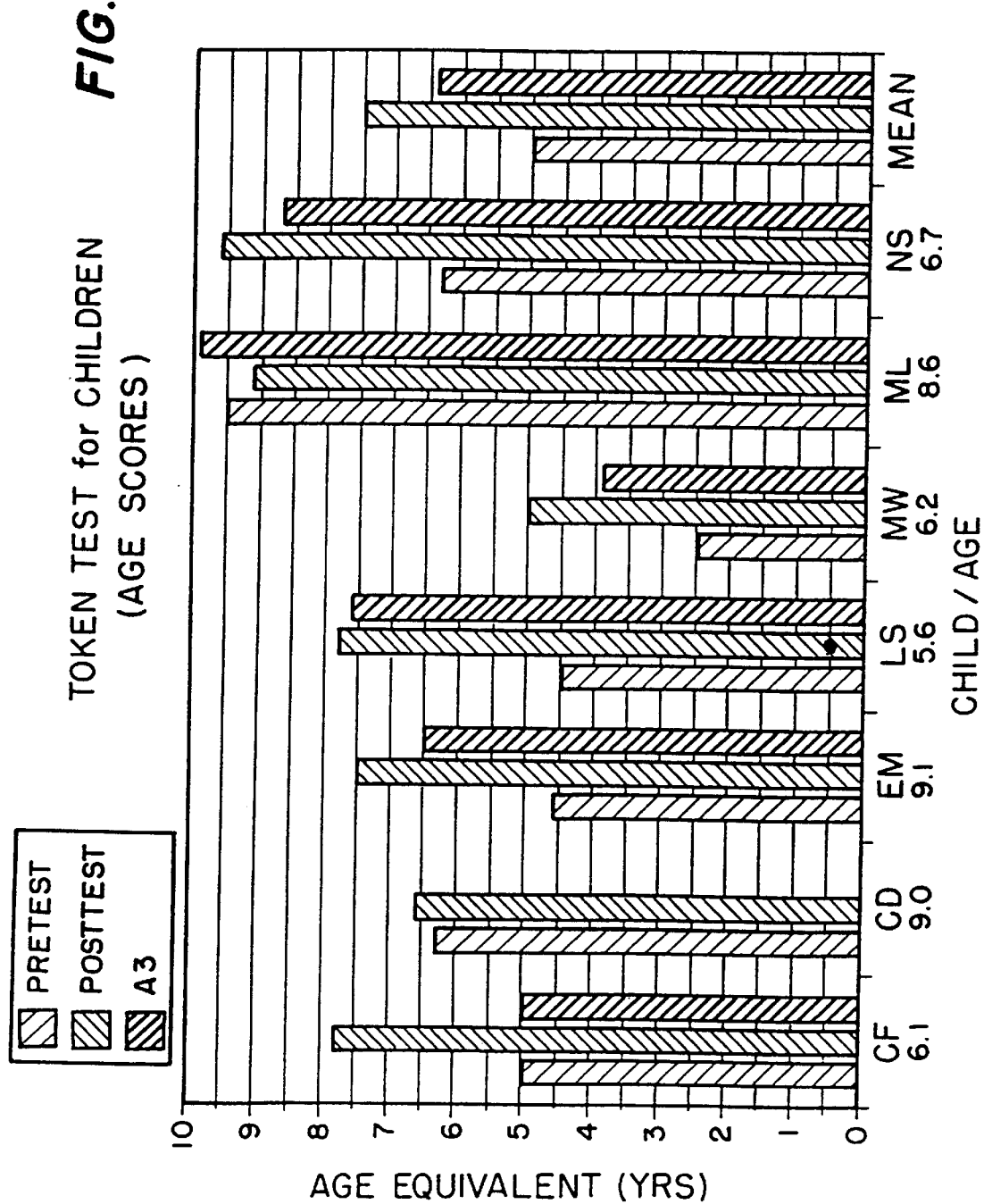
FIG. 11 is a graph of the Token Test (receptive language) for the seven L/LD children for the pretest and post-test times and, where available, three months after the training.

As can be seen in FIGS. 8 through 11, remarkable improvement was demonstrated for each of the receptive language and memory tests (Session D, E, F, G). The difference between pretest and post test scores are highly statistically significant, demonstrating marked improvement in language reception, including phonological (GFW test) (FIG. 8) as well as grammatical understanding of language (TROG and CYCLE) (FIGS. 9 and 10) tests and memory for language (TOKEN test) abilities (FIG. 11). These data represent remarkably striking improvements in the core receptive language functions that cause the greatest difficulty for L/LD children. Further, it is precisely these abilities that have been shown in longitudinal outcome studies of L/LD children to be most predictive of their subsequent academic achievement. Indeed, improvement occurred within six weeks that is comparable to or surpasses that found in a previously completed five year longitudinal study of L/LD children.

Figure 12:
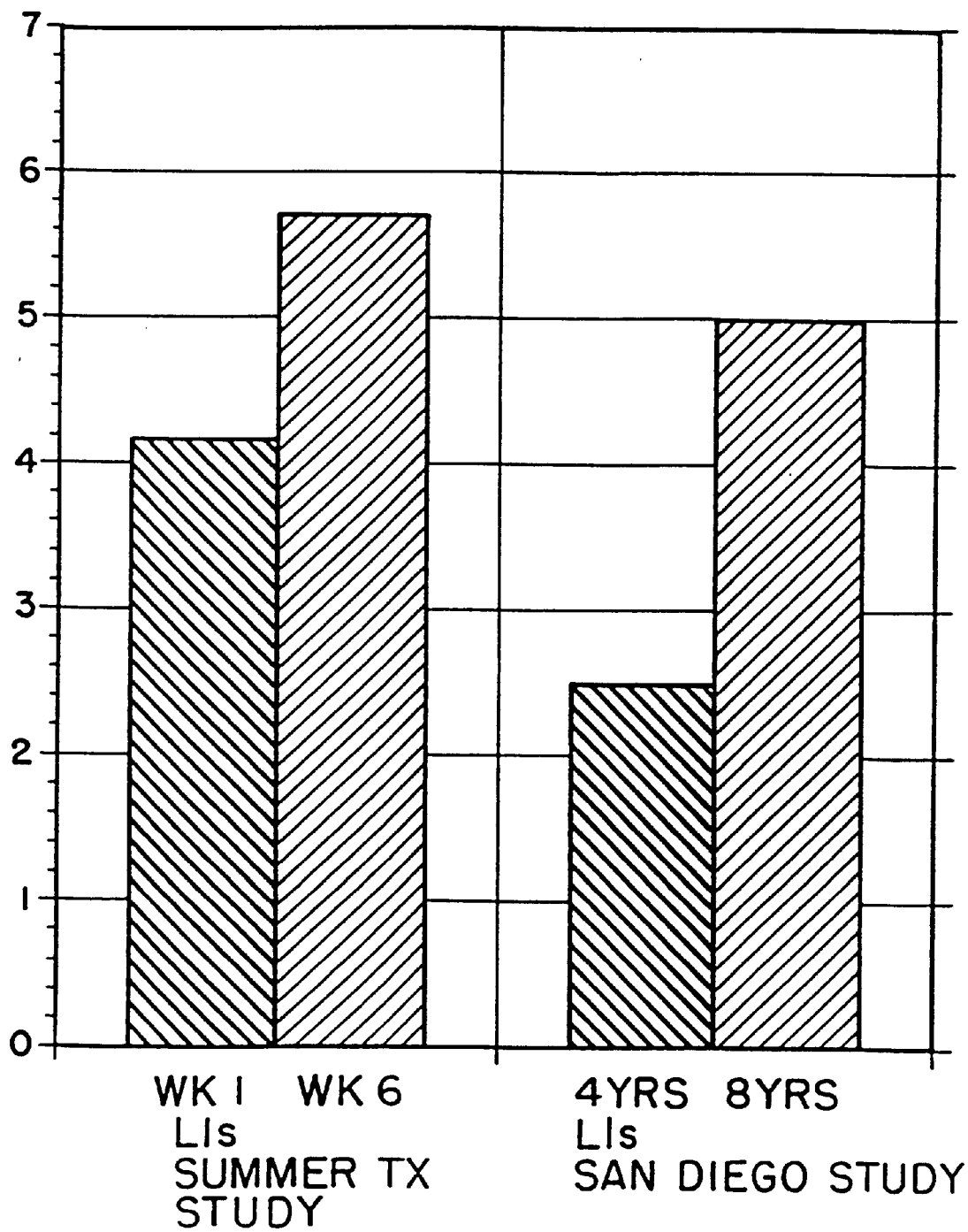
FIG. 12 is a graph showing the improvement on the CYCLE test for L/LD children from age 4 to age 8 over a five year period and the improvement in the seven tested L/LD children over the four week training session using this invention.
Figure 13:
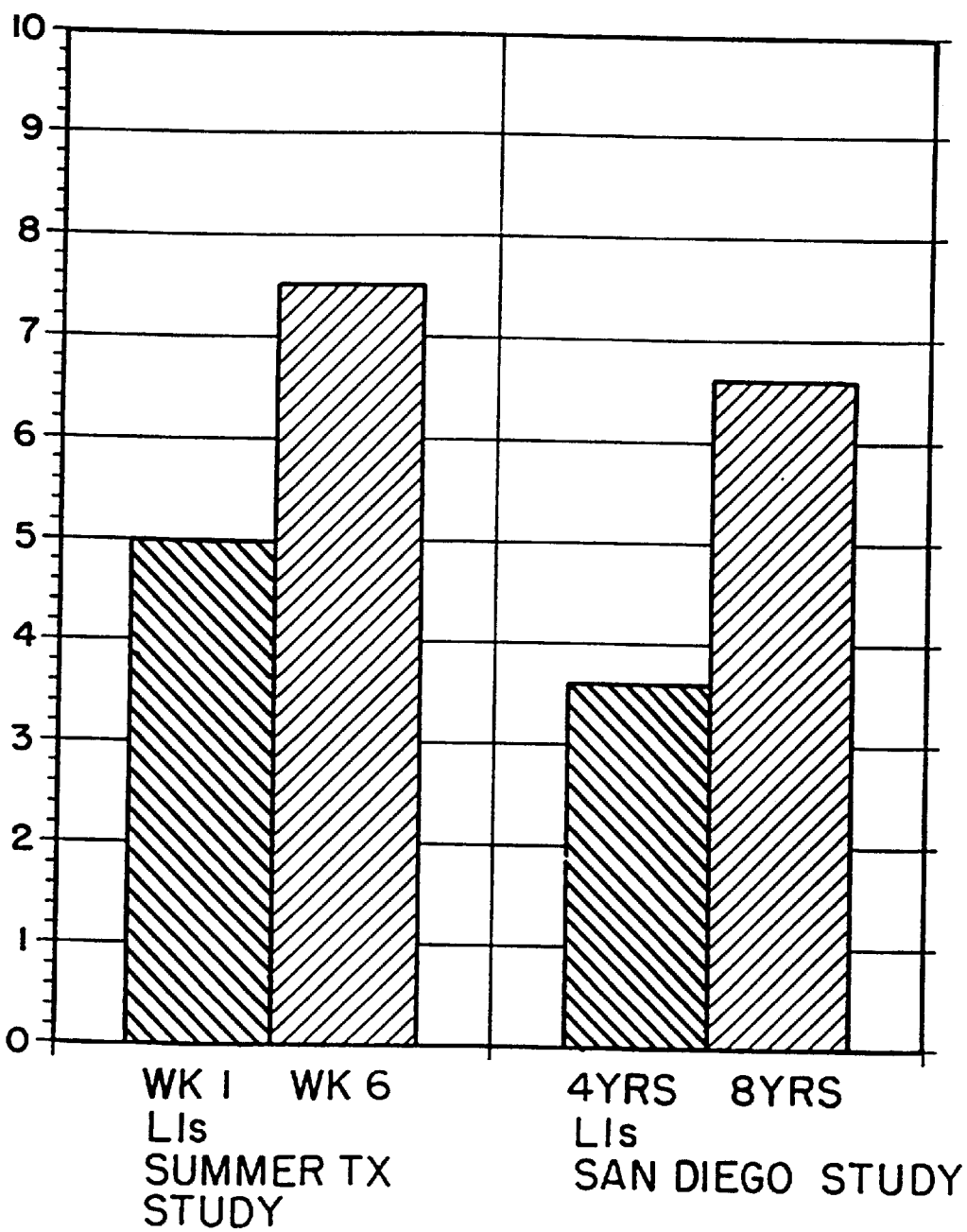
FIG. 13 is a graph showing the improvement on the Token Test for L/LD children from age 4 to age 8 over a five-year period and the improvement in the seven tested L/LD children over a four week training session using this invention.
Figure 14:
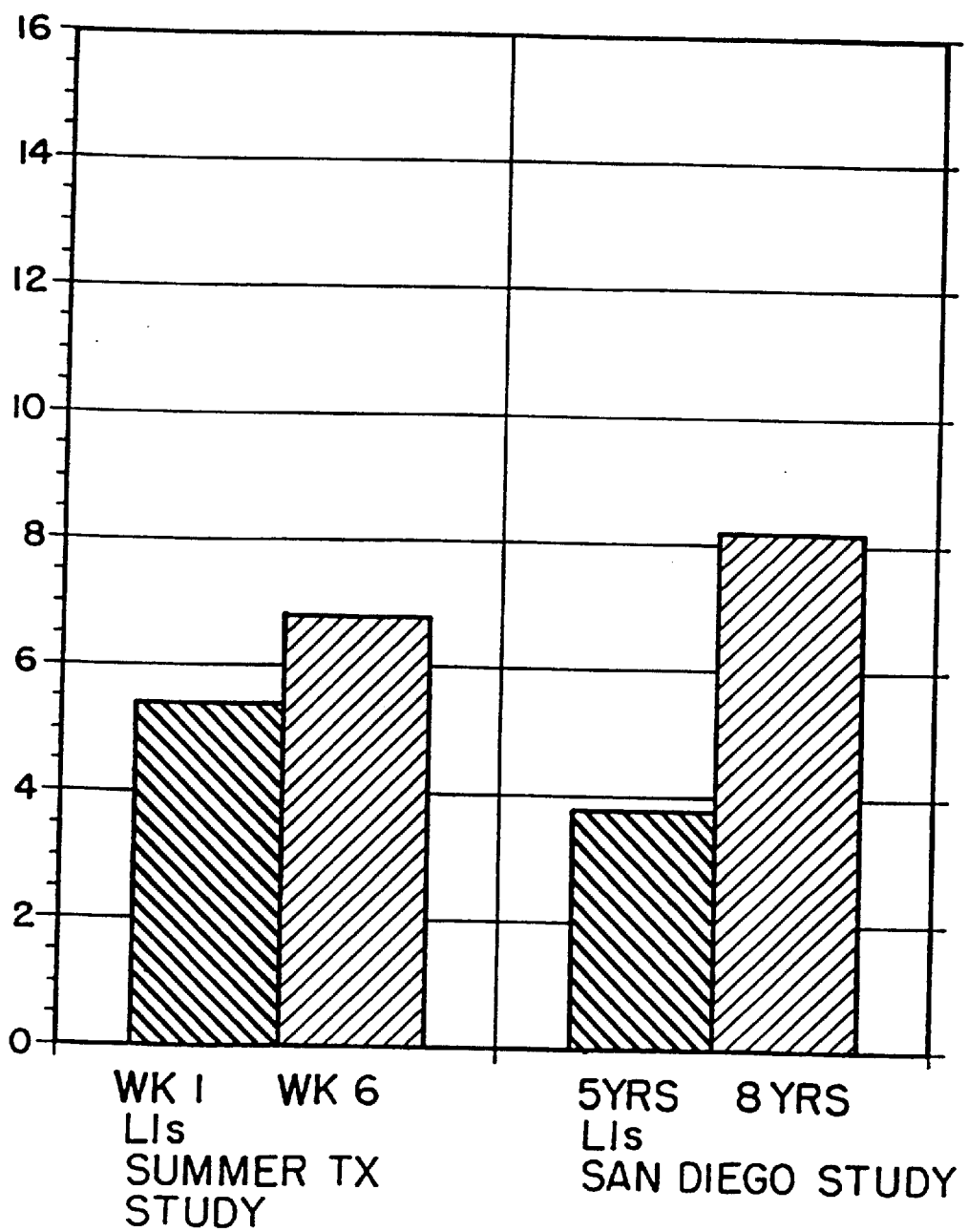
FIG. 14 is a graph showing the improvement on the GFW test for L/LD children from age 4 to age 8 over a five-year period and the improvement in the seven tested L/LD children over a four week training session using this invention.

In the San Diego Longitudinal study (directed by Tallal and Curtiss, 1980–1987) the language development of 60 L/LD children, selected based on the same criteria used in the current study, was assessed over a five year period. As many of the same benchmark measures were used in both the previous longitudinal study and the current training study one can make direct comparisons. FIG. 12 shows the results of improvement on the CYCLE test from the age of 4 to the age of 8 years for the L/LD children in the longitudinal study. The L/LD children were receiving speech, language and reading therapy within the public school for their disabilities during the time course of the longitudinal study. Therefore, one can compare directly the state-of-the-art therapies currently available to L/LD children in the public schools to the therapy embodied in this invention. In the current study at pretest the L/LD children as a group (mean age=7.2 yrs.) were performing at a level equivalent to 4.2 year old normally developing children on the CYCLE test. However, after only 4 weeks of exposure to training with the acoustically modified speech stimuli, as well as temporal sequencing training using the computer games, these children were able to process language at a level equivalent to 5.8 year old normally developing children. In contrast, results from the San Diego longitudinal study demonstrate L/LD children progress, very slowly in their development of language comprehension taking 5 years to develop the equivalent skills that normally developing children acquire in 2 ½ years. In striking contrast, the L/LD children participating in the current remediation study made very rapid progress. After only 4 weeks of training with computer modified speech and temporal integration training, their development of core language comprehension abilities improved by 1.6 yrs. whereas the longitudinal sample improved only 2.6 yrs. on the same measure over a 5 year period with conventional speech, language and reading therapies. Similar results are seen on the Token Test and GFW (FIGS. 13, 14).

Figure 15:
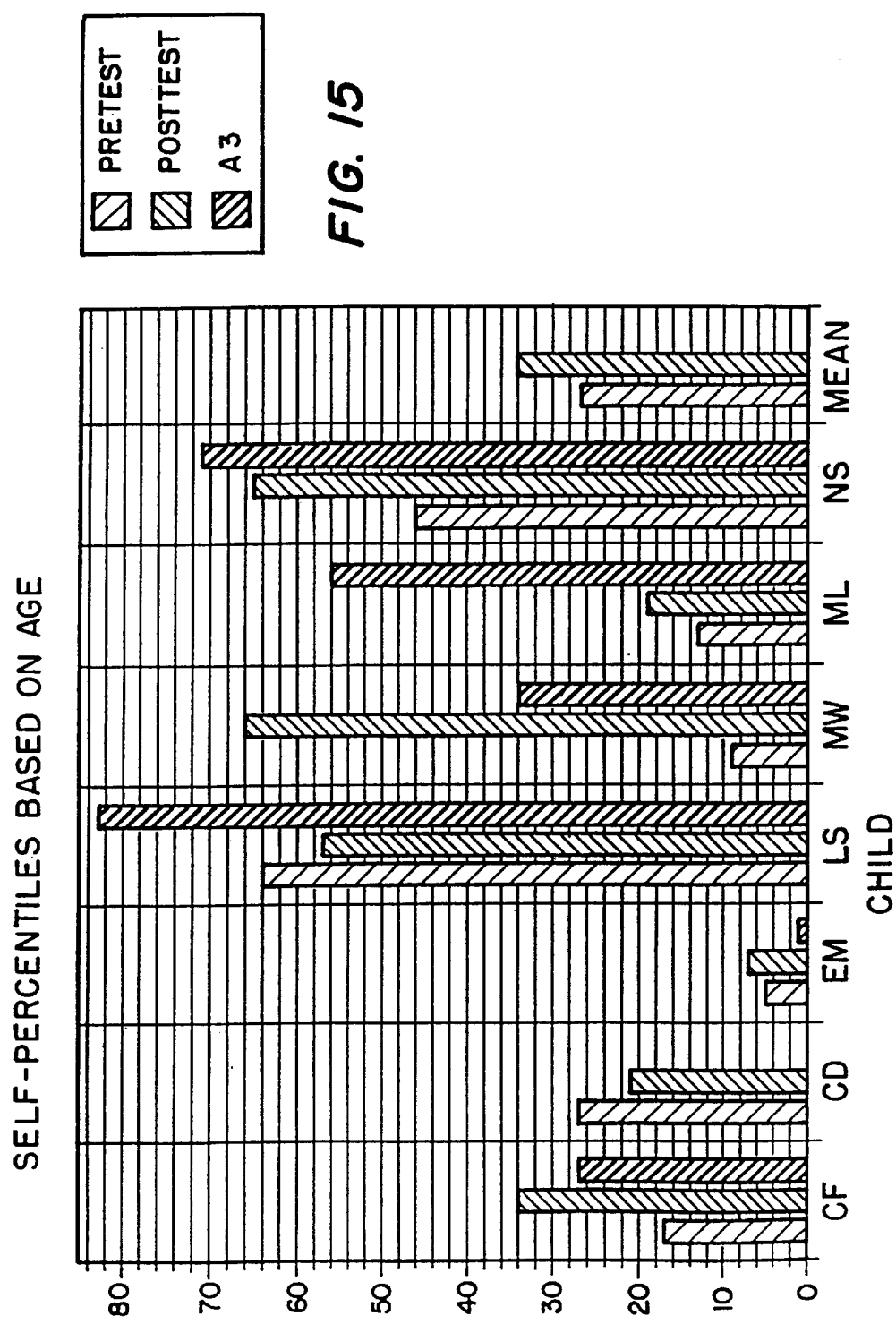
FIG. 15 is a graph of the improvement in the CELF test (sentence imitation) for the seven tested L/LD children at pretest, post-test and, where available, three months after training.
Figure 16:
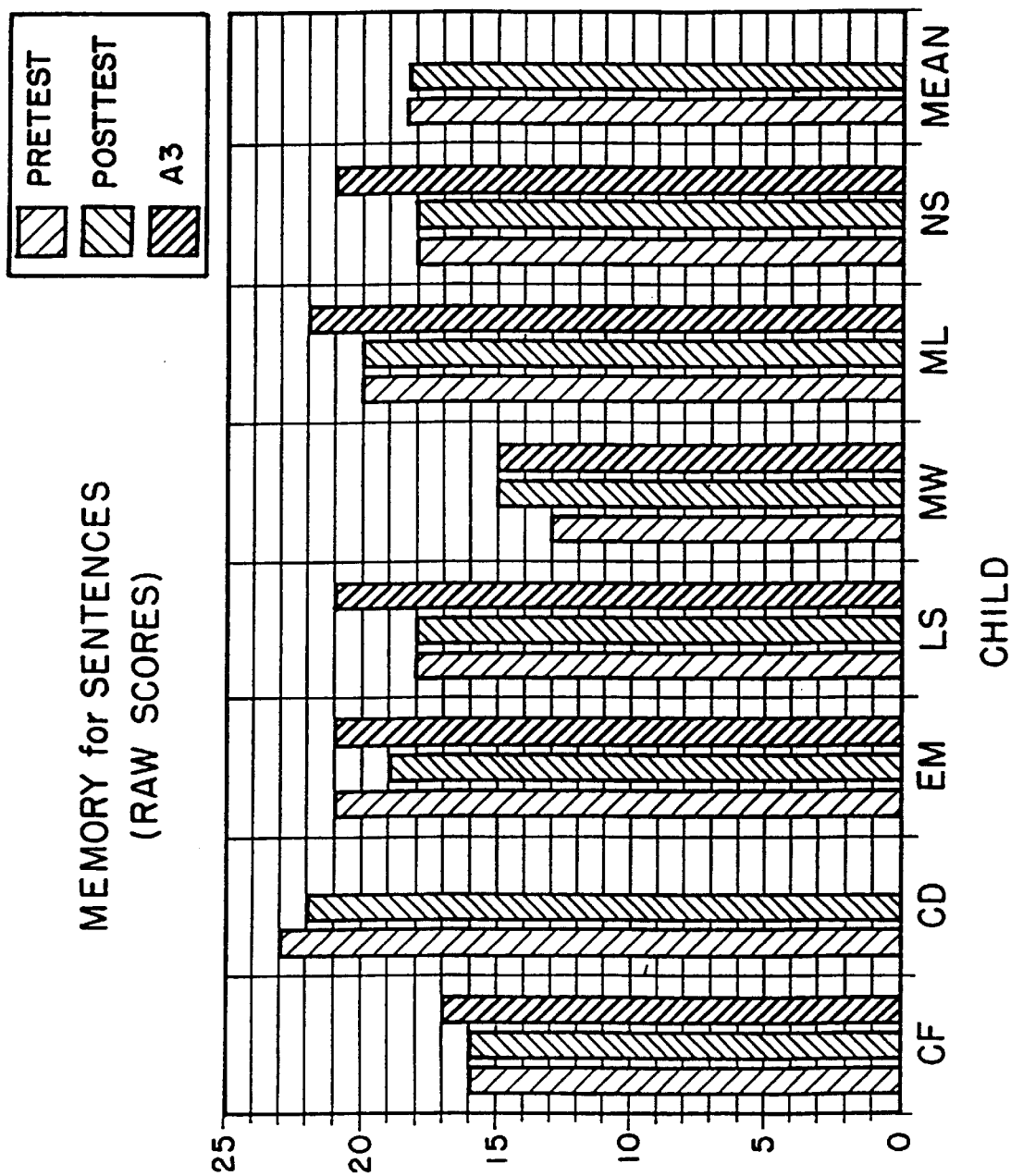
FIG. 16 is a graph of the results of the memory for sentences for the seven L/LD children at pretest, post-test and, where available, three months after training.

Although computer alterations of the acoustic input of speech was specifically aimed at training the receptive aspect of language (from the phonological to the syntactic level), measures of speech articulation and expressive language functioning were also collected throughout the study. As expected, less improvement was demonstrated from pre to post test on the expressive language measures, as these were not explicitly trained in this study (see FIGS. 15, 16).

Figure 17:
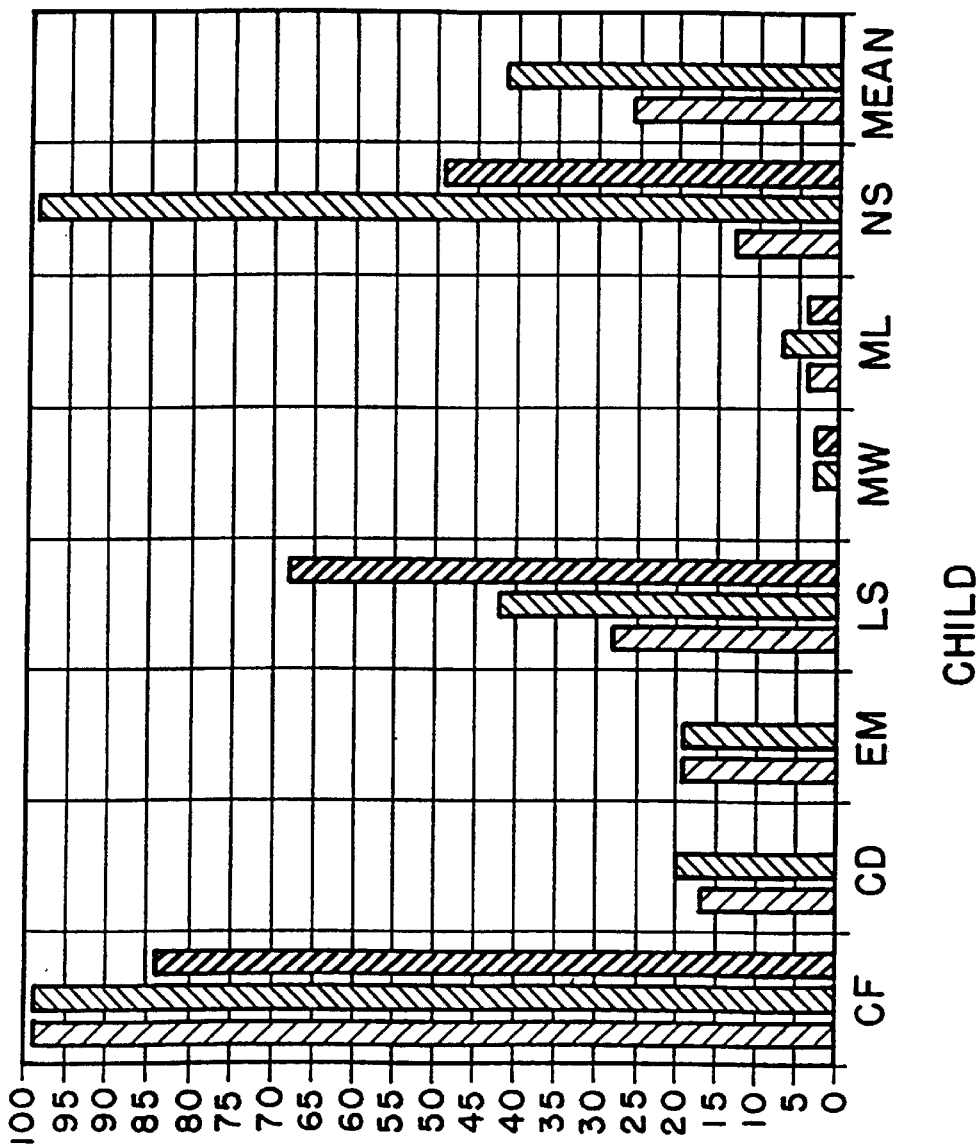
FIG. 17 is a graph showing the results of the Goldman-Fristoe articulation test on the seven L/LD children at pretest, post-test and, where available, three months after training

It is encouraging to note that a significant improvement in speech articulation was accomplished at the phonological level even though this was not directly trained in this study. Previous research with L/LD children demonstrated that their temporal deficits occur in both the perceptual and motor systems affecting both speech input as well as output at the acoustic as well as phonological level. Thus, it can be hypothesized that training in the rate of temporal integration at the perceptual level, as well as exposure to temporally modified speech, might not only improve perceptual processing and thus receptive language comprehension, but also the rate of motor precision in the production of temporal cues in speech articulation. The significant improvement found on the Goldman-Fristoe Articulation Test (FIG. 17) provides tentative support for this hypothesis at the phonological level. Strong support awaits future detailed computer analyses of precise temporal motor planning, at the acoustic and phonetic levels based on the speech production data obtained during this training study. However, the current analysis at the phonological level demonstrates significant improvement in speech articulation and suggests that these perceptual training measures may not only improve aspects of receptive language and reading, but may also have a direct impact on improving the temporal precision of articulatory coding (and therefore intelligibility) of the speech output of these children.

In conclusion, these data provide extremely strong support for the efficacy of the therapies embodied in this invention. It has been demonstrated that these therapies significantly improve the temporal processing, speech, language and reading abilities of L/LD children and that the magnitude of improvement is considerably greater than has been demonstrated to result from currently available therapies.

Six of the seven children were available for post test assessment in week 12 (graphed as $A_3$), after having received 6 weeks without exposure to modified speech or temporal processing training. As can be seen in the previous figures as $A_3$ test results, although there was some decline in receptive language abilities when the therapy was discontinued, much of the progress was maintained. These data suggest that a longer training period may be necessary to fully remediate and "cement" fundamental speech, language and reading skills. Nonetheless, these data are encouraging in that a substantial proportion of the progress that was made during this brief training period can be maintained even in the absence of further direct training.

Thus, not only has this invention met the need for training individuals with a learning disability, it has also provided the capability to "cure" the temporal processing deficit that occurs in those individuals who are dysphasic or dyslexic, and are unable to process rapidly received stop consonants, hence unable to grasp the meaning of the spoken words.

It is felt that the information set forth above with the experiment outlined in great detail is a sufficient disclosure to enable one to practice this invention; hence, further discussion of its method of operation will not be undertaken.

This invention is not limited to the above description but is defined by the following claims.

What is claimed is:

1. A method for training an individual to distinguish stop consonant sounds from vowel sounds, the training using audible presentation of processed speech, the method comprising:

providing prerecorded speech to a computing device for processing;

processing the prerecorded speech to elongate the stop consonant sounds; and presenting the processed speech to the individual;

wherein as the individual hears the processed speech with elongated stop consonant sounds, the individual's recognition of the stop consonant sounds improves.

2. The method for training an individual as recited in claim 1 wherein the individual has language-based learning disabilities.

3. The method for training an individual as recited in claim 1 wherein the individual is dyslexic.

4. The method for training an individual as recited in claim 1 wherein the individual is a stroke victim.

5. The method for training an individual as recited in claim 1 wherein the individual is learning a foreign language.

6. The method for training an individual as recited in claim 1 wherein the stop consonant sounds and the vowel sounds are typically combined as phonemes.

7. The method for training an individual as recited in claim 6 wherein the phonemes are ba or da.

8. The method for training an individual as recited in claim 1 wherein the stop consonant sounds typically have a duration of less then 50 ms.

9. The method for training an individual as recited in claim 1 wherein the vowel sounds typically have a duration greater than 80 ms.

10. The method for training an individual as recited in claim 1 wherein the audible presentation is accomplished by a computer.

11. The method for training an individual as recited in claim 1 wherein the audible presentation is by accomplished by a tape recorder.

12. The method for training an individual as recited in claim 1 wherein the audible presentation is accomplished by a compact disk (CD) player.

13. The method for training an individual as recited in claim 1 wherein the prerecorded speech comprises audible training exercises for language learning impaired individuals.

14. The method for training an individual as recited in claim 1 wherein the prerecorded speech comprises storybooks that have been placed on tape, or on CD.

15. The method for training an individual as recited in claim 1 wherein said step of providing the prerecorded speech comprises:

converting the prerecorded speech into a digital format that may be processed by the computing device.

16. The method for training an individual as recited in claim 1 wherein said step of processing the prerecorded speech comprises:

performing a Fast Fourier Transform (FFT) on the prerecorded speech to obtain spectral values for the speech;

interpolating the spectral values to elongate the stop consonant sounds without elongating the vowel sounds; and performing an inverse FFT on the interpolated spectral values to obtain a time domain representation of the processed speech.

17. The method for training an individual as recited in claim 16 wherein said step of processing the prerecorded speech further comprises:

before performing said step of performing an inverse FFT, truncating portions of the vowel sounds;

wherein truncation of the vowel sounds prevents the elapsed time of the processed speech to not exceed the elapsed time of the prerecorded speech.

18. The method for training an individual as recited in claim 1 wherein the prerecorded speech has frequency envelopes, said step of processing further comprises:

emphasizing selected at least one of the frequency envelopes within the prerecorded speech.

19. The method for training an individual as recited in claim 18 wherein the selected frequency envelopes correspond to frequency bands containing rapid temporal changes in frequency content.

20. The method for training an individual as recited in claim 19 wherein the selected frequency envelopes correspond to the stop consonant sounds within the prerecorded speech.

21. The method for training an individual as recited in claim 19 wherein the amount of emphasis given to the selected frequency envelopes is approximately 10–20 db.

* * * * *